United States Patent Office 3,516,069
Patented June 2, 1970

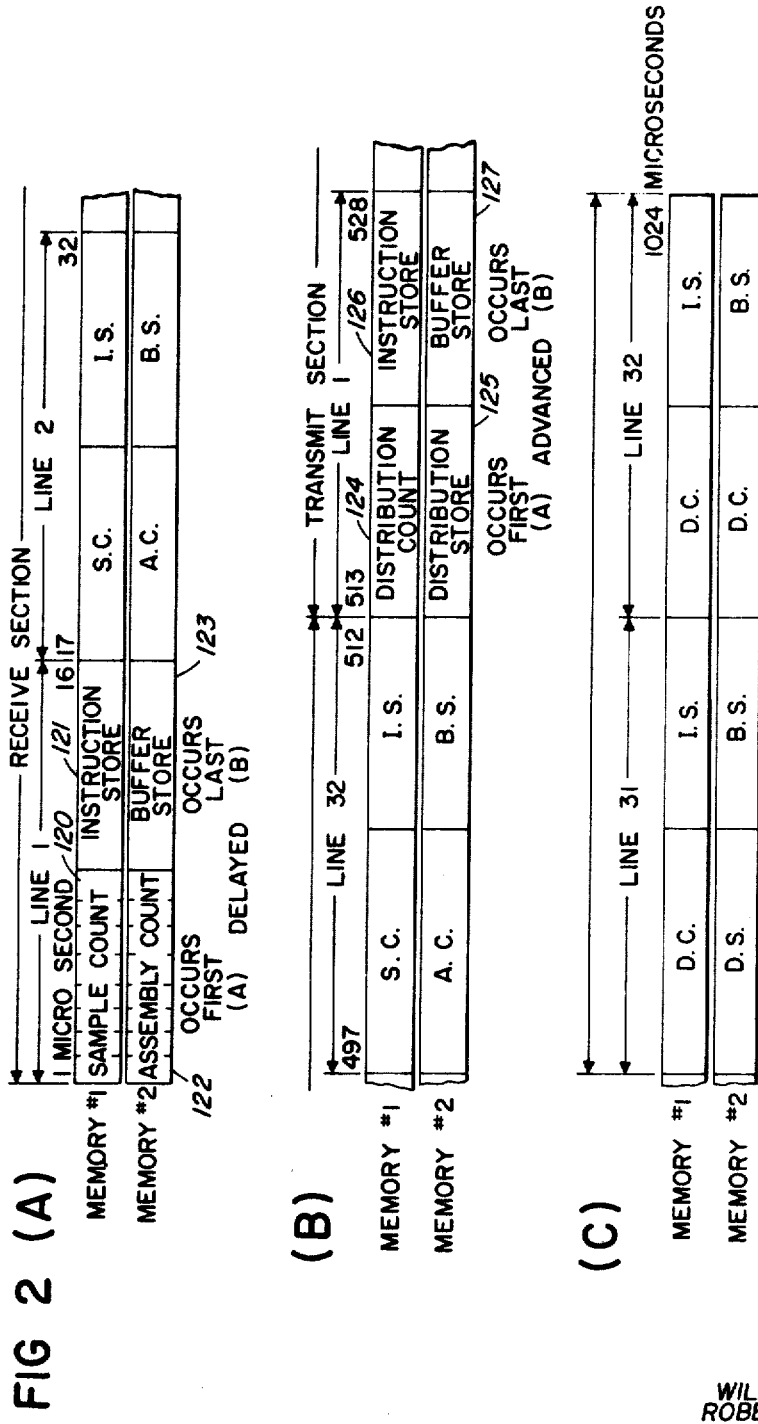

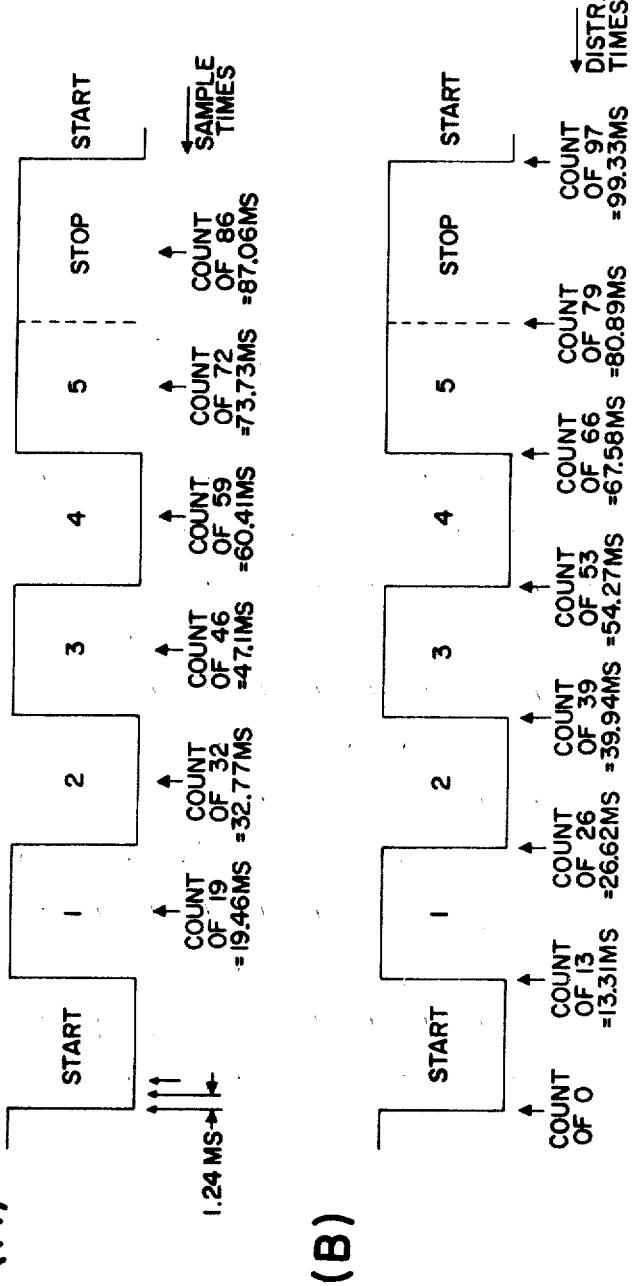

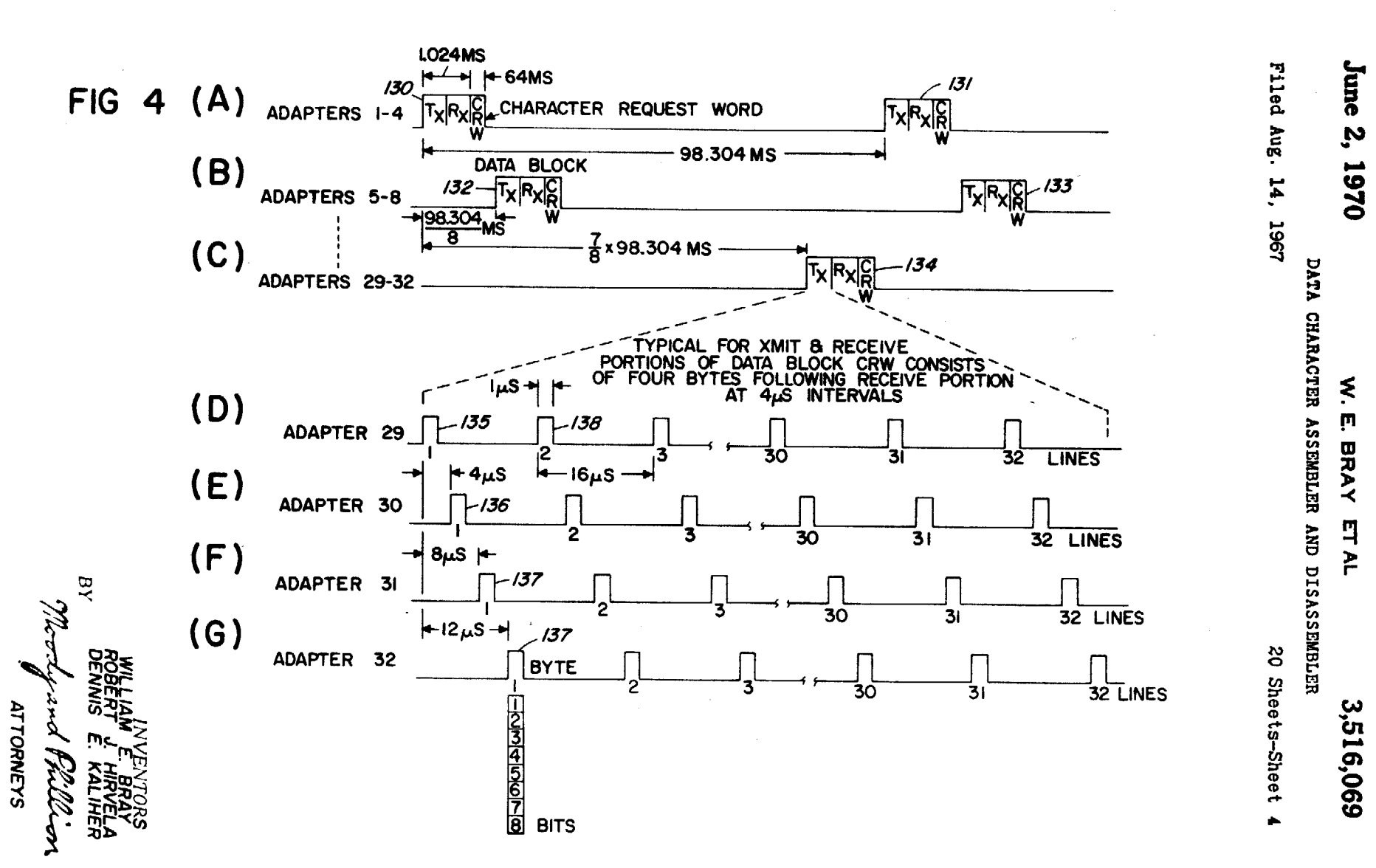

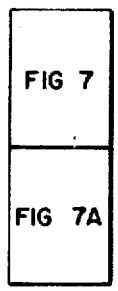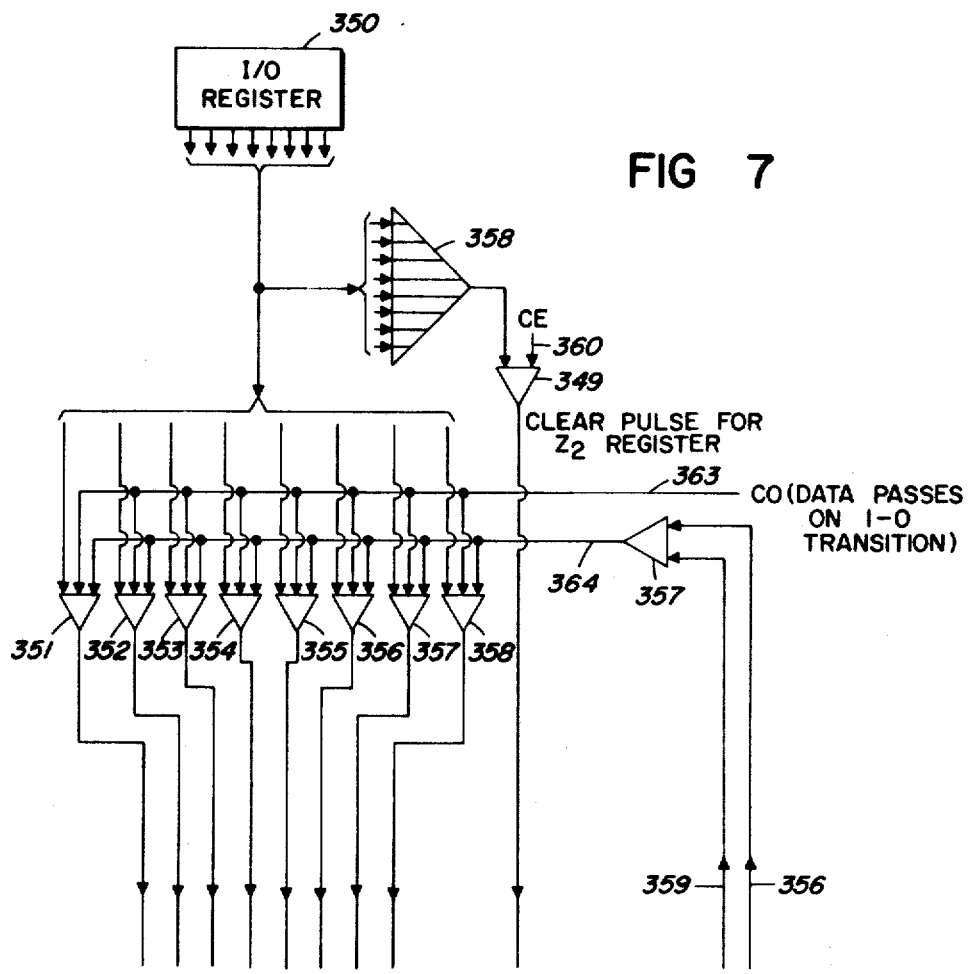

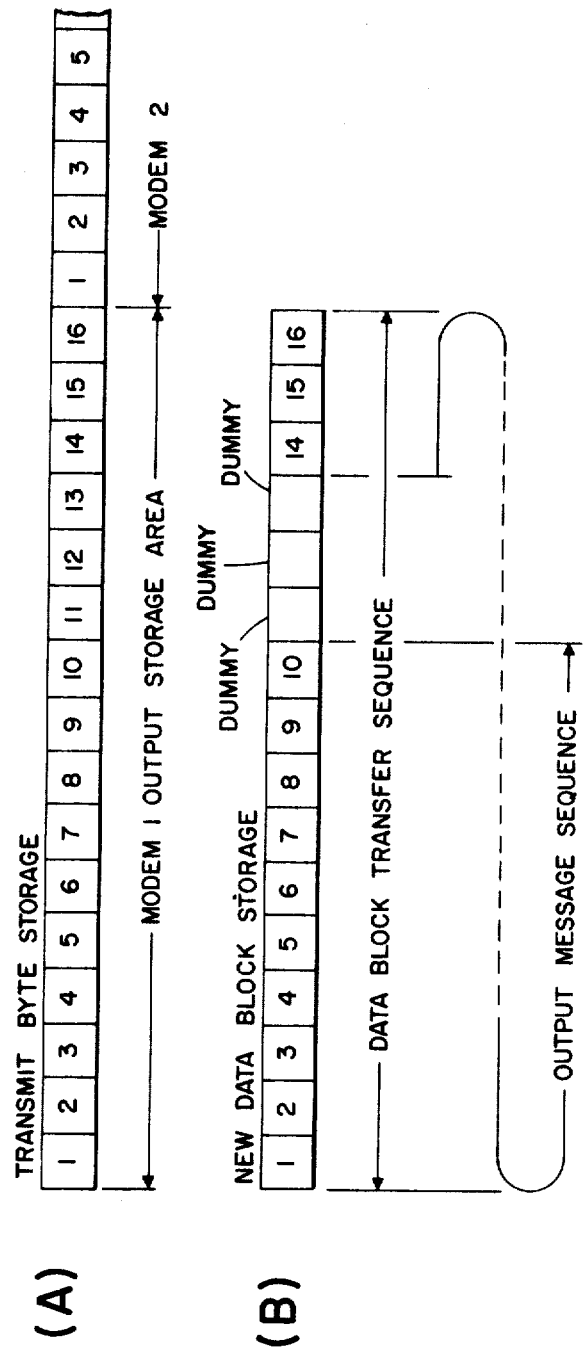

---

3,516,069
DATA CHARACTER ASSEMBLER AND DISASSEMBLER
William E. Bray, Robert J. Hirvela, and Dennis E. Kaliher, Cedar Rapids, Iowa, assignors to Collins Radio Company, Cedar Rapids, Iowa, a corporation of Iowa
Filed Aug. 14, 1967, Ser. No. 660,323
Int. Cl. G06f 7/00
U.S. Cl. 340—172.5
18 Claims

ABSTRACT OF THE DISCLOSURE

An interfacing adapter employing at least two circulating data type memories with the first halves of the circulating memories providing storage and timekeeping means for receiving data in serial form from a peripheral device at the data rate of said peripheral device, storing said data, and then transferring said stored data in parallel form to a data processor at a data rate compatible with the data processor operating characteristics. The second halves of the two circulating memories provide storage means and timekeeping means for receiving data in parallel form from the data processor at the data rate of said data processor, storing such data, and then distributing said stored data in serial form to the peripheral devices at a data rate compatible with the peripheral device operating characteristics.

---

This invention relates generally to means for interfacing the transfer of data between a data processor and a plurality of peripheral sources of data such as, for example, teletypewriters (Teletype machines), or a plurality of data modems. More specifically, the invention relates to an interfacing adapter utilizing at least two circulating memories which function to receive information from the peripheral sources either in parallel or in serial form and then to store said information in the circulating memories in serial form, to transfer said stored information to the data processor in serial form in response to proper instructions, to receive information from the data processor in serial form, to assemble and store such received information in the serial memory, and finally to distribute said serially stored information from the circulating memories to the peripheral sources such as the teletypewriters, data modems, etc.

In current data processing systems, particularly those data processing systems employed as switching systems, it is necessary to receive words from the plurality of peripheral devices, such as a battery of teletypewriters, or a plurality of data modems. For example, in the commerical airline industry, a central data processing or switching system is employed to receive and process information from Teletype machines positioned at various airline terminals throughout the country. The processed information is transmitted back to calling airline terminals upon command.

The data organization, the word and bit rates, and the signal level of the peripheral sources of information are usually different from those of the data processor. Some means is required to interface between the processor and the peripheral sources. Up to the present time, information has been transferred from a peripheral source, such as a teletypewriter, to a data processor by periodically scanning the teletypewriter lines leading into the data processor from each Teletype machine. Such a method involves the scanning of each baud period of each teletypewriter at least three times in order to make certain that all bauds from all teletypewriters are received by the data processor and are received accurately. With a large battery of Teletype machines the percentage of operating time that a data processor must consume in simply scanning the Teletype machines can amount to a rather substantial portion of the total computer operating time. For example, assume that a particular data processor has a maximum capacity of 512 Teletype machines. Assume further that it is necessary to scan each baud three times in order to insure accuracy. Assume still further that it requires five microseconds to store the results of the single scan of a single baud in the main memory of the data processor. Consequently, to scan each baud of the 512 Teletype machine (each Teletype output three times), requires a total of approximately 7.6 milliseconds. Since a baud length on the average is about 13 milliseconds, the foregoing means that approximately 60% of the computer time is employed scanning the 512 Teletype machines. The 60% figure does not include the amount of computer time required to compare the various scans in order to insure that the criteria of accuracy has been met with respect to individual bauds.

Some of the above-mentioned problems were solved by a structure described in U.S. Pat. No. 3,350,697, issued Oct. 31, 1967, to Robert J. Hirvela, and entitled, "Storage Means for Receiving, Assembling and Distributing Teletype Characters." In the copending patent, which also employs circulating memories, the data is received from peripheral sources, such as a battery of Teletype machines, and then supplied to successive ones of said serial memories so that words from a Teletype machine are stored in parallel form, with each bit stored in a separate one of a plurality of serial memories, all having a common timing. For example, thirteen serial memories can be employed to store data from the battery of Teletype machines, with eight of said serial memories being required to store each word from the Teletype machines, and the other five serial memories performing a timekeeping function to determine which baud is being received from a given Teletype machine at a given time and controlling the supplying of said baud to the correct one of the eight data storing serial memories. Such prior art device described in said copending application has proven to be useful and a satisfactory answer to the problem of transferring information back and forth between a data processor and peripheral sources of data. Such prior art adapter means, however, inherently has a large and costly capacity and requires many gating means in order to direct the data to and from the proper data storing serial memories at the proper time.

In many applications it is desired to have an adapter which is somewhat simpler and less expensive than the prior art device and which requires less gating means. Further, in many applications it is desirable to have an adapter which is more versatile and can be employed over a larger range of loads.

It is accordingly the primary object of the invention to provide an adapter for transferring information between a data processor and various types of peripheral data sources, such as a battery of Teletype machines or a plurality of modems, and employing a small number of serial memories which circulate data in a serial manner, as the principal means of data assembly, data storage, and data distribution within the adapter, with the information being stored in serial form in said serial memories.

It is another object of the invention to provide an adapter which will receive information from a peripheral device, such as a Teletype machine, assemble and store said data in the proper word form for delivery to a data processor, and then at regular periodic intervals deliver the words to the data processor from all the teletypewriters at a high-speed transmission rate.

It is a further object of the invention to receive data from the data processor in bit parallel form and a high-speed transmission rate for temporary storage and reorganization and then to distribute such data to peripheral devices, such as a battery of Teletype machines, in serial form at the speed of operation of said peripheral devices.

A third purpose of the invention is a data adapter for transferring data from peripheral devices, such as a battery of Teletype machines to a data processor and employing at least two circulating data memories into which the incoming data is assembled in the proper form for later distribution to the input/output register of a data processor.

A fourth purpose of the invention is a data adapter for transferring data from a battery of Teletype machines to a data processor and employing circulating data type memory means into which the data from the Teletype machines is supplied in serial manner, assembled therein, and then at subsequent periodic intervals transferred at high speed to the data processor as a block of information.

A fifth purpose of the invention is a data adapter for transferring data from a data processor to a battery of Teletype machines and employing a circulating data type memory means into which data from the data processor is supplied in parallel form in blocks of information, and then later distributed from the serial memory to said block of Teletype machines at the baud receiving rate of said Teletype machines.

A sixth aim of the invention is a data adapted for transferring data between a data processor and a battery of Teletype machines and employing circulating data type memory means in which information is received either from the battery of Teletype machines or from the data processor, and is later distributed, respectively, to the data processor or the Teletype machine in the proper form and at the proper distribution rate for said data processor or battery of Teletype machines.

A seventh object of the inevntion is a data adapter for the assembly, storage, and distribution of data passing between a data processor and a battery of Teletype machines, and resulting in a minimum of access time between said data processor and said adapter.

An eighth object of the invention is the general improvement of data adapters, which interface between slow speed peripheral devices and data processors.

In the following statement of invention it will be assumed that the data adapter is employed between a battery of Teletype machines and the data processor and, further, that there are 32 Teletype machines in said battery of Teletype machines. It is to be understood, however, that the adapter can be employed with peripheral devices other than Teletype machines and can be designed to operate with a battery of Teletype machines consisting of either more or less than 32 Teletype lines.

For purposes of brevity a circulating data type memory will hereinafter frequently be referred to as a circulating memory or a serial memory.

In accordance with the invention, there is provided first and second circulating type delay line memories. The first circulating memory provides, generally, the timekeeping and supervisory functions, while the second circulating memory provides, generally, character assembly and storage functions. Each of said circulating memories has a propagation time of 1016 microseconds and is connected in series with an 8-bit shift register so that the entire propagation time length of the memory loop is 1024 microseconds. The clock rate for the system is one mHz., so that the number of bits that can be stored in each serial memory, including its associated shift register, is 1024. The storage capacity of the two serial memories is further divided into two equal halves, each consisting of 512 bit positions. One group of 512 bits of each circulating memory is employed in the reception of information from the teletypewriter machines and the transmission of such received information to the data processor, and the other 512 bits of each circulating memory is utilized in receiving information from the data processor and then distributing it to the appropriate Teletype machines.

Since 32 Teletype machines are being serviced, 16 bits in the transmit half and 16 bits in the receive half of each circular memory can be assigned to each Teletype machine. Each of these 16-bit memory segments is divided into two 8-bit sections which perform the following functions. In the receive section of the second circulating memory (circulating memory #2) the words from a given Teletype machine are assembled as they are distributed from said Teletype machine. The assembling of these Teletype words is under the control of the timekeeping count contained in the corresponding 8 bits of circular memory #1. After the Teletype word has been completely assembled it is caused to be transferred to the other 8-bit memory section of the 16-bit memory segment, which other 8-bit section is referred to herein as a buffer storage position.

Since the fastest Teletype machines operate at about 100 words per minute, it is necessary to clear all the buffer storage positions before the beginning of the reception of the next Teletype word. By clearing the buffer storage positions is meant the transfer of the stored Teletype words to the data processor. Such transfer of information from the buffer storage positions to the data processor is effected every 96 cycles of the circulating memory. Since each cycle of the circulating memory takes 1.024 milliseconds, 96 cycles thereof will occupy 98 milliseconds of time. The transfer of the words from the buffer storage positions to the data processor occurs during a single pass of the circulating memory through the 512-bit half-section thereof allocated to the receive function.

In transferring data from the data processor to the Teletype machine, the data is first transferred at a high-speed rate and in parallel form to an appropriate transmit buffer storage position in the transmit 512-bit section of circulating memory #2. The transfer to all of the buffer storage positions, representing the 32 Teletype machines, is made during a single pass over the 512-bit section allocated to the transmit function and, in the particular arrangement to be described herein, occurs immediately before the data from the teletypewriters is transmitted as a block to the data processor.

In transmission of data from the data processor to the adapter, as in the case of the reception of information from the Teletype machines, the 512 data bit positions in the second circulating memory, allocated to the transmitting function, are divided into 32 16-bit segments, one 16-bit segment for each Teletype machine. Each of the 16-bit segments is divided into two 8-bit sections, one of the 8-bit sections being a transmit buffer storage section into which the information is transmitted directly from the data processor, in parallel form. Such data is subsequently transferred into the adjacent 8-bit section, defined herein as the distribution store section and from which section the data is distributed to the Teletype machine at the proper times and at the proper distribution rate of said Teletype machine. A second timekeeping circuit located in the corresponding address positions in the transmit section of the first circulating memory functions to distribute each of the eight bits in the transmit buffer storage section in sequence, and at the proper time, to the addressed Teletype machine. Such distribution will cover a period of approximately 100 milliseconds in the case of the fastest Teletype machine. As each distribution storage section is empitied of its data, a new character, which has been supplied to the associated transmit buffer storage section from the data processor, is moved into the distribution storage section.

A separate storage means is provided, with one bit allocated to each Teletype machine. Into these 32-bit positions is recorded the information that a given transmit buffer storage section is emptied. The information contained in the separate storage means is known as a character request word and is supplied to the data processor at the end of the transfer of information from the assemblage storage positions to the data processor. In this manner the data processor is informed as to which of the transmit buffer storage sections are empty and consequently can receive a character from the data processor at the next transfer of information from the data processor to the adapter.

A control circuit consisting of AND gates, OR gates, and other logic blocks is controlled by a common timing circuit to perform the above identified functions. More specifically, the control circuit includes, for example, a line counter which functions to address each of the Teletype machines at the appropriate time corresponding to each of the two 8-bit memory portions in the two circulating memories. For example, during reception of a signal from a given Teletype machine addressed by the line counter, the 8-bit assembly storage section in the second circulating memory allocated to said given Teletype machine will be occupying the 8-bit shift register of said second circulating memory. Similarly, during the transmission of data from the transmit buffer storage in the second circulating memory, the 8-bit transmit buffer storage section allocated to said given Teletype machine, will occupy the 8-bit shift register of said second circulating memory, at the same time that the said given Teletype machine is addressed by said line counter.

During the transfer of characters from the second serial memory to the data processor the 8-bit receive buffer storage section in the second circulating memory will contain the character from a given Teletype machine at the precise time the data processor is to receive the information from said given Teletype machine. Also when the data is being transferred from the data processor to the first circulating memory for a given teletypewriter machine the 8-bit transmit buffer storage section associated with said given Teletype machine will, at that time, occupy the eight stages of the shift register of said second circulating memory.

The invention can also be employed with peripheral devices other than Teletype machines. For example, the invention can be employed with data modems which supply data either in the form of bit serial or bit parallel characters. Generally speaking, a data modem is a device which modulates data, usually in two-level signal form, upon a carrier in a form suitable for transmission of such data, and also demodulates incoming data, usually back into a two-level signal. For a description of one type data modem, reference is made to U.S. Pat. No. 2,977,417 issued Mar. 28, 1961, to M. L. Doelz et al. and entitled, "Minimum Shift Data Communication System." In the case of data being received from modems in the bit serial form the structure of the invention is similar to that which will be described in connection with Teletype machines. The timing, of course, will be different since the information received from modems is generally at a considerably faster rate than from Teletype machines and frequently is time synchronous in nature.

Data received in bit parallel or byte form, however, from data modems require some modification of the invention in that such data must be supplied to the second circulating memory in parallel form and circuitry similar to that required for assembling a Teletype word is not needed. Also, when the data bytes are transferred from the adapter to the data modems they are transferred in parallel form, i.e., in byte form, rather than in serial form, as in the case when distributing information into Teletype machines. However, other than the changes required for parallel reception and distribution of information between the adapter and the data modems, the structure and general principles involved will be the same as in the case where the adapter is employed with Teletype machines or with a bit serial type modem peripheral equipment.

The above-mentioned and other objects and features of the invention will be more fully understood from the following detailed description thereof when read in conjunction with the drawings in which:

FIG. 1 is a general logic diagram of the overall system;

FIGS. 2A, B and C are a set of planning charts showing the arrangement of buffer assembly storage sections, the distribution storage sections, and the timekeeping counting sections of the two circulating memory units;

FIGS. 3A and B is a set of waveforms showing the relation between the timekeeping means of the second circulating memory for receiving words from the Teletype machines and also for distributing words to the Teletype machines from the circulating memories;

FIGS. 4A–G is a set of waveforms showing how more than one adapter can be employed to service a single output register of the data processor;

FIG. 7 shows logic employed to transfer information from the data processor to the adapter;

FIG. 7B shows the relationship existing between FIGS. 7 and 7A.

Figure 13:
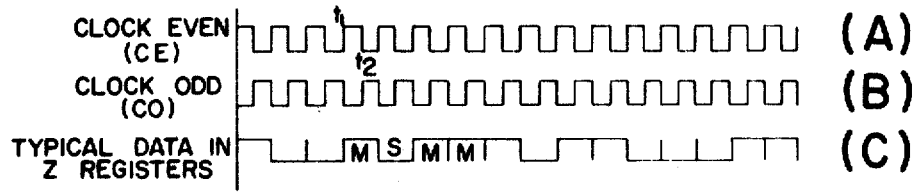
Figure 14:
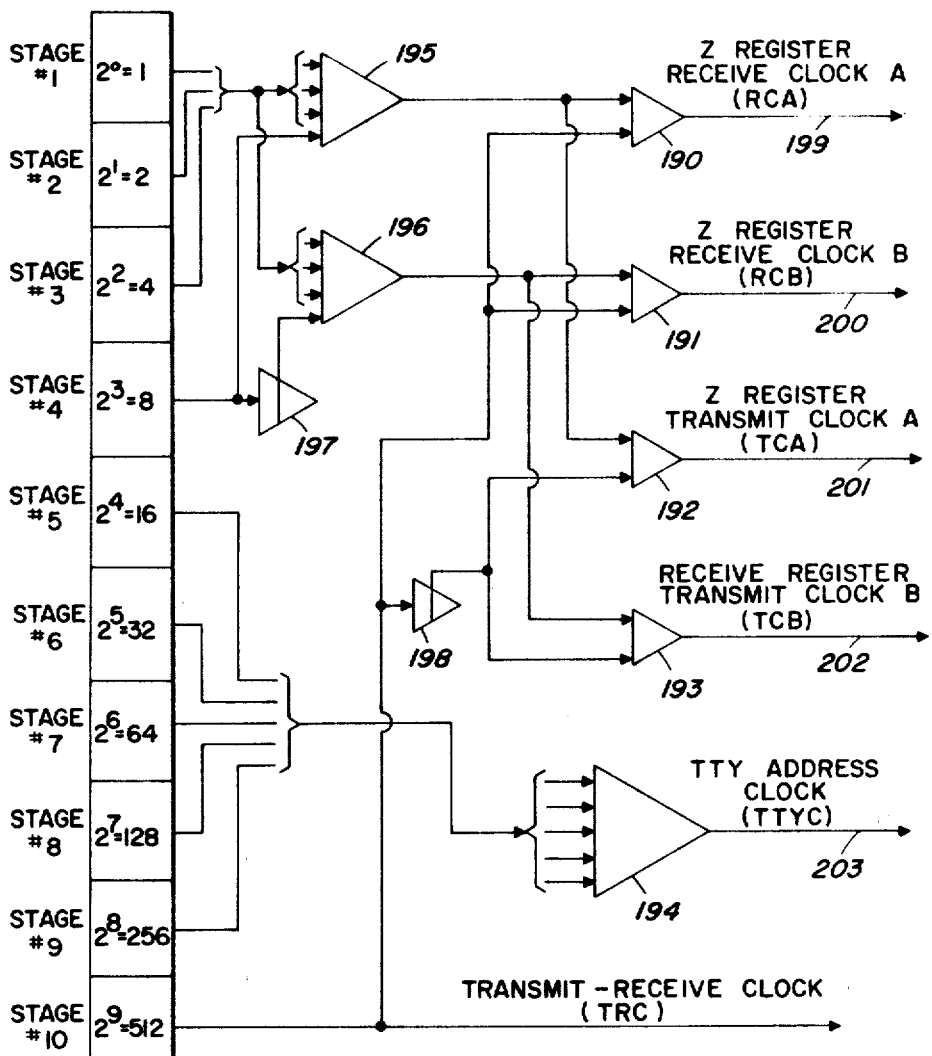
Figure 15:
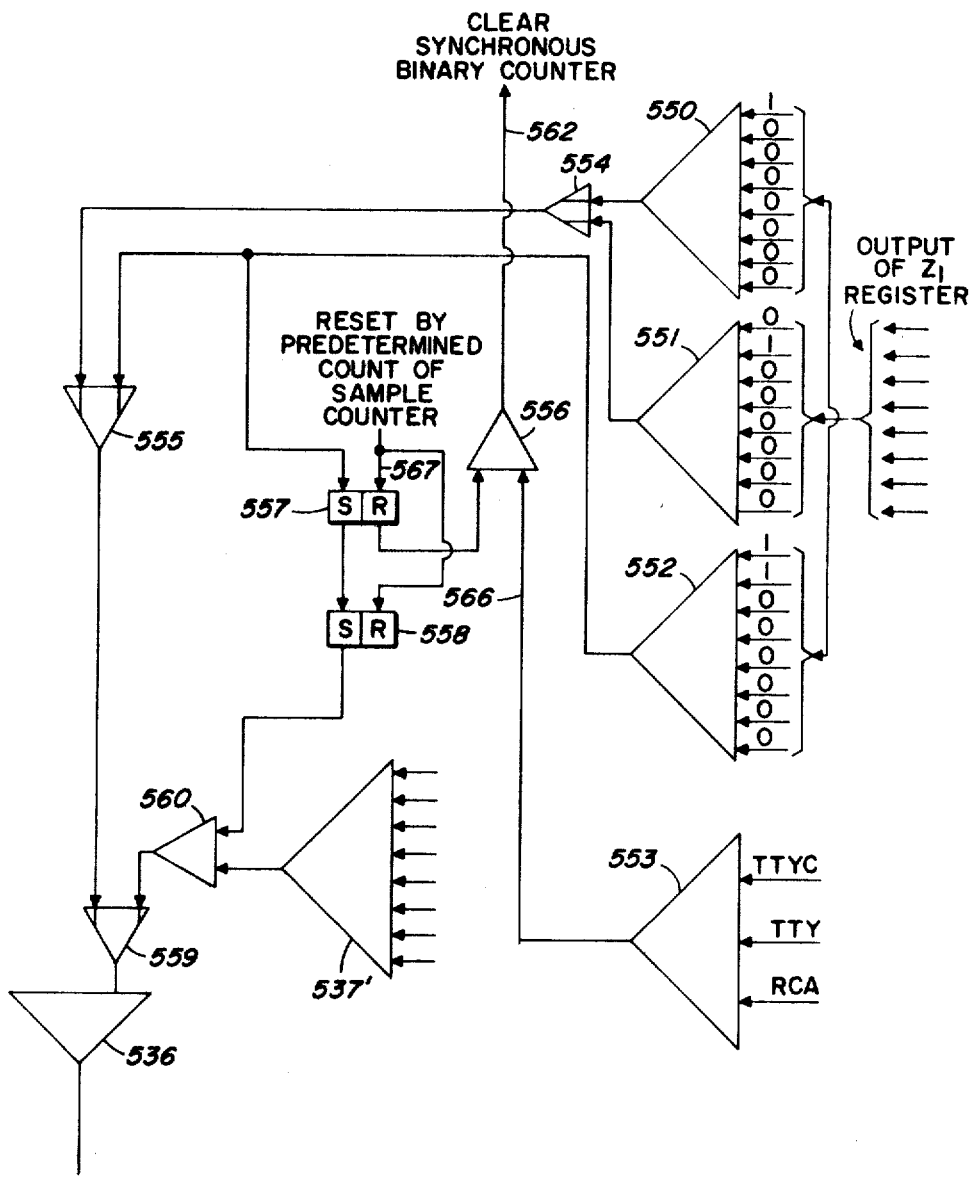
Figure 16:
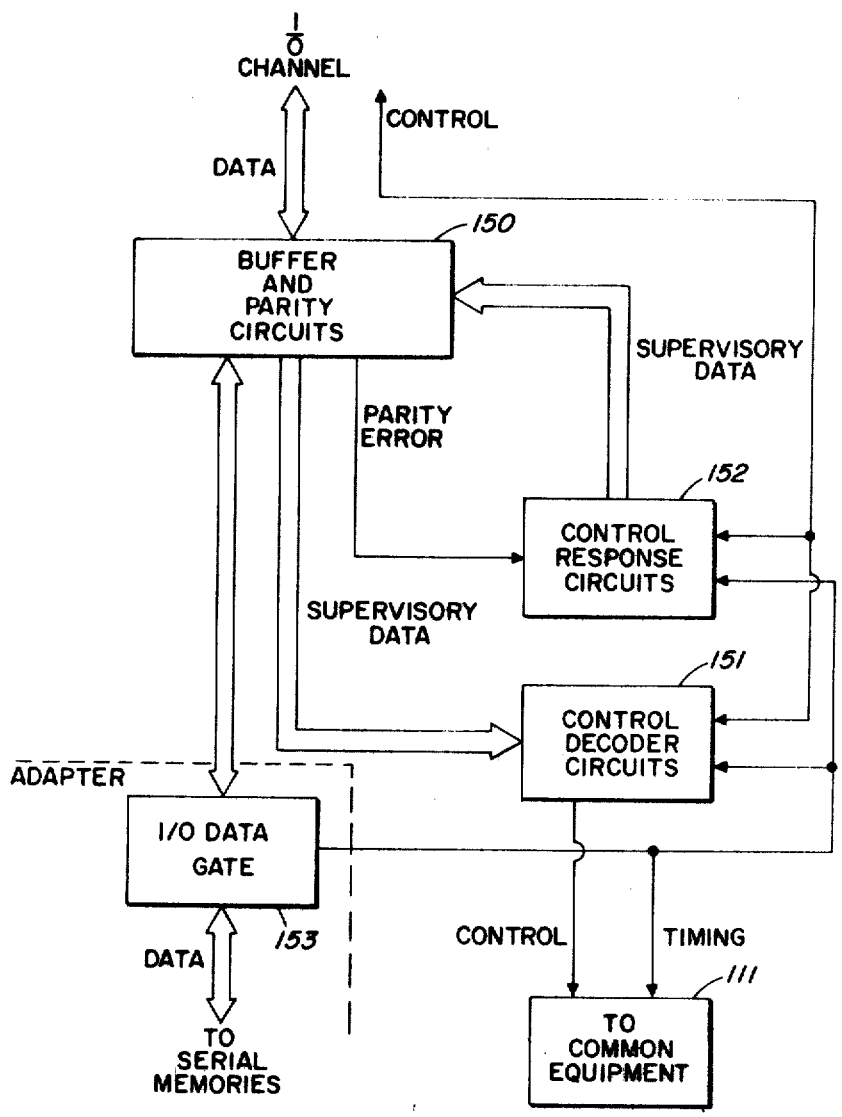
Figure 17:
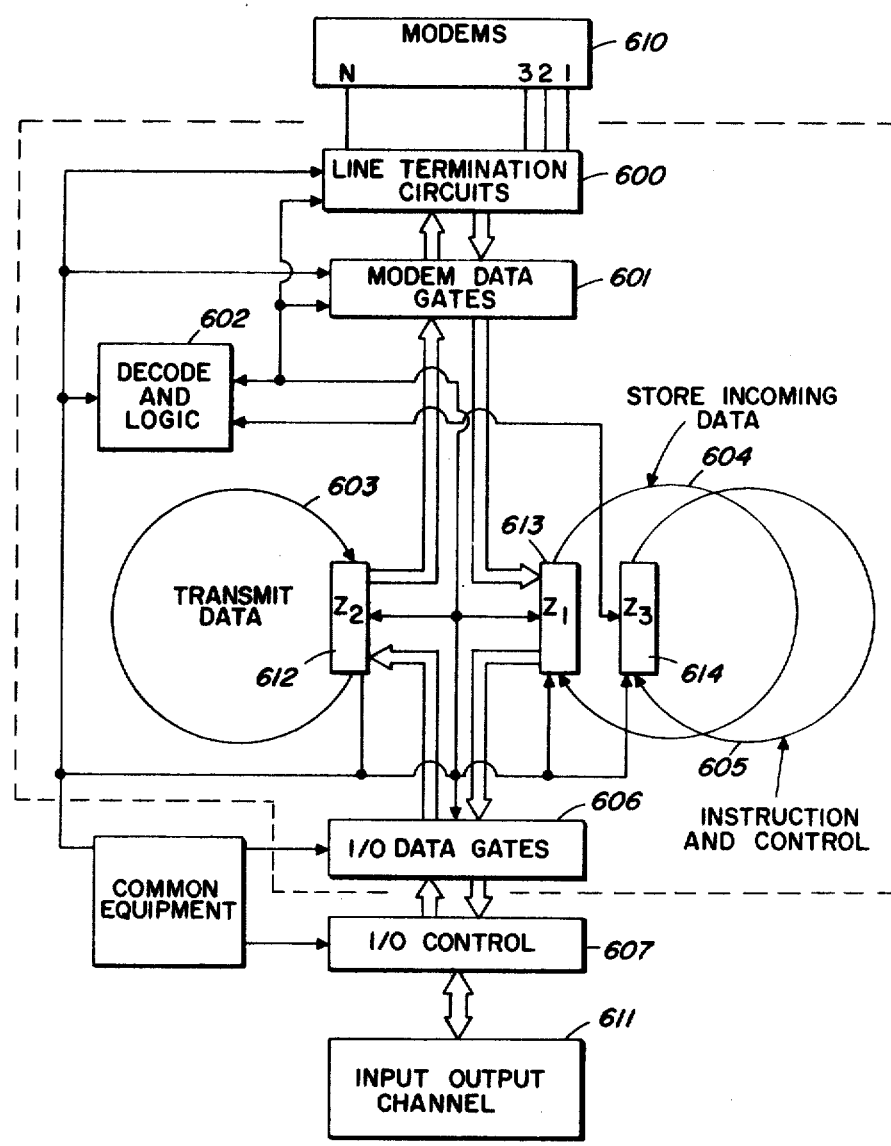
Figure 18:
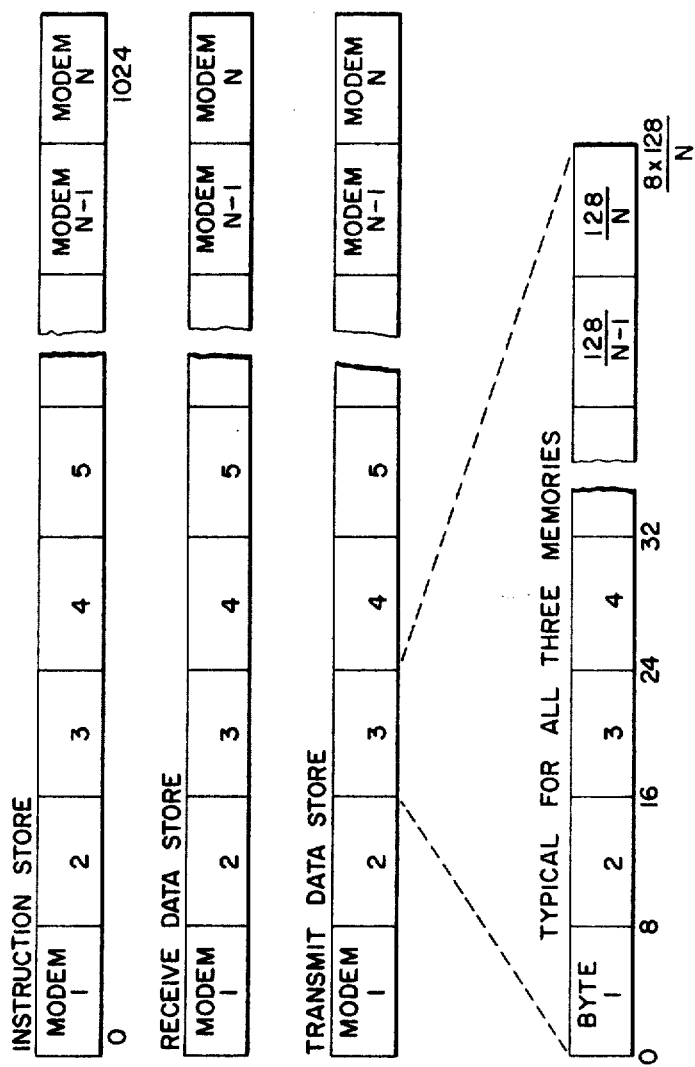

FIGS. 13A, B and C is a diagram of the waveforms employed in the system, and including clock signals;

FIG. 14 shows the logic of the line counter organization which is the main counting means for the system;

FIG. 15 shows the logic for detecting the start pulse from a Teletype machine;

FIG. 16 shows the logic for supervising errors in the system;

FIG. 17 shows the overall logic of the adapter for use with modems;

FIG. 18 is a planning chart of the data organization or the circulating memories of the adapter when used with modems;

FIGS. 19A–E is a chart showing the data format and transmit request procedure for the adapter when used with modems; and FIGS. 20A and B show data organization when a plurality of adapters are used together with inputs from modems.

Due to the comparative complexity of this specification, it will be discussed in sections in accordance with the following general outline:

(I) General Description of Invention (FIGS. 1, 2, 3, 4, and 14)

Figure 19:
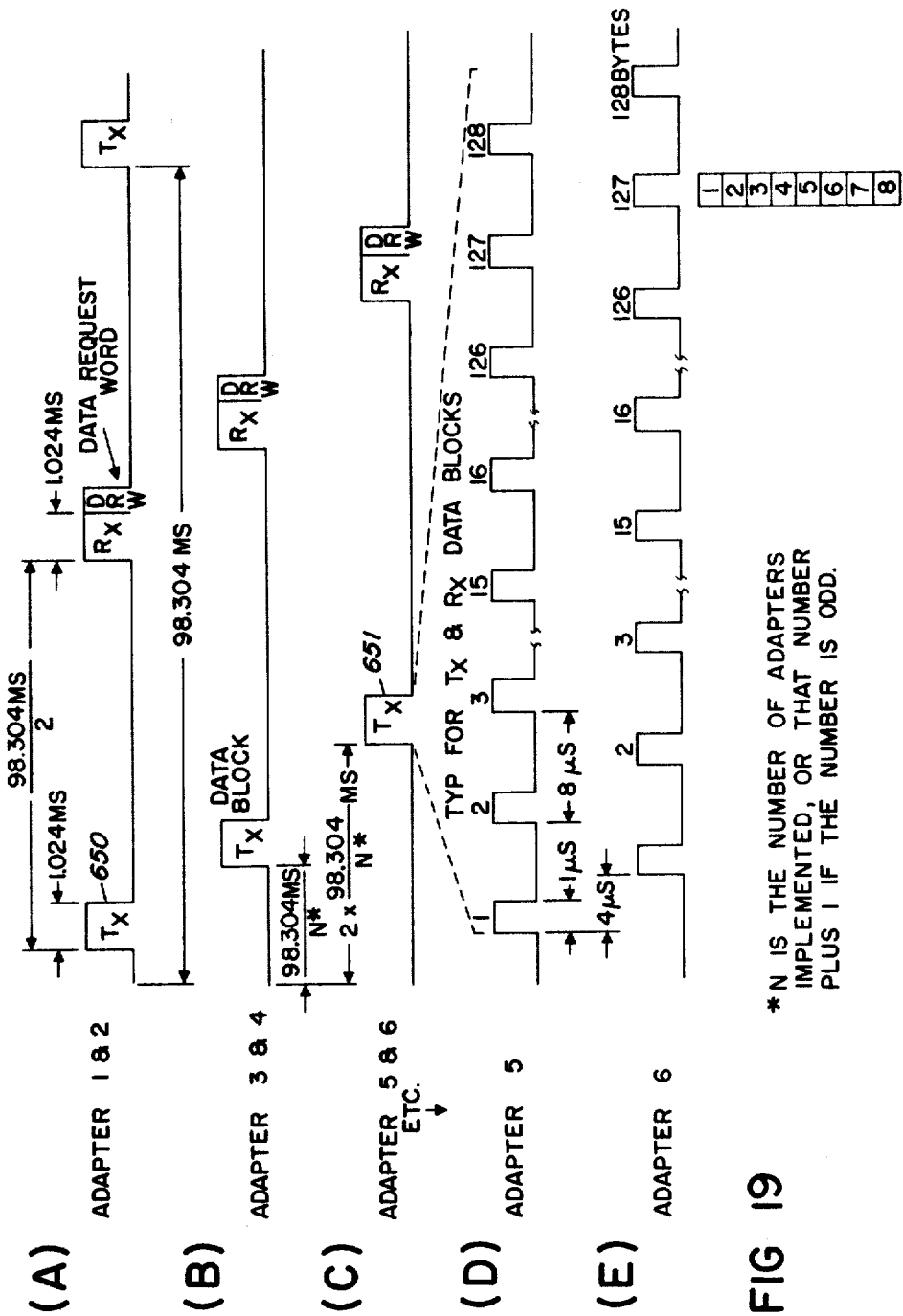

(A) Transfer of Data From TTY's to Adapter
(B) Transfer of Data Between the Adapter and the Input/Output Register of the Data Processor
(C) Transfer of Data From the Adapter to the Teletype Machines
(D) Timing, Decoding, and Logic Circuits of the System
(II) Logic Circuit for Receiving Data From TTY's by Adapter (FIG. 5)
(III) Logic Circuit for Transmitting Data From Adapter to the TTY's (FIG. 6)
(IV) Logic Circuit for Transferring Data From Adapter to I/O Register of the Data Processor and From I/O Register to Adapter (FIGS. 7 and 7A)
  (A) Transmission of Data From Input/Output Register to Adapter
  (B) Transmission of Data From Adapter to Input/Output Register
  (C) Generator of Character Request Word Instruction Pulse
(V) Logic Circuit for Assembly and Transmission of Character Assembly Word From Adapter to I/O Register (FIG. 10)
(VI) Logic Circuit for Shifting Data From Buffer Storage to Distribution Storage for Transmission to TTY's (FIG. 9)
(VII) Logic Circuit for Shifting Received Data From Assembly Storage to Buffer Storage in Preparation for Transfer to I/O Register (FIG. 8)
(VIII) Logic For Initiating Count in Timekeeping Counters and For Incrementing Stored Count by "1" Each Cycle of Operation (FIGS. 11 and 12)
  (A) The Distribution Count Memory Section
  (B) The Sample Count Memory Section
  (C) Operation of Modem Adapter
(IX) Logic for Detecting the Start Pulse From a TTY (FIG. 15)
(X) Logic for Adaptation of Invention for Use with Modems (FIG. 17)
  (A) General Description
  (B) Detailed Description of Function of Serial Memories in Modem Adapter (FIG. 18)
  (C) Operation of Modem Adapter (FIG. 19)

In order to further facilitate a description of the structure certain abbreviations will be employed, as follows:

CE=clock even
CO=clock odd
RCA=Register Clock A (This clock pulse marks that point in time when the 8-bit assembly storage memory section of circular memory #2 and the 8-bit sample count of circular memory #1 are both in the 8-bit registers associated therewith during the receive section, and when the 8-bit distribution store section and the 8-bit distribution count memory sections are in the 8-bit shift registers of circulating memories #2 and #1, respectively, during the transmit half of the cycle.)
RCB=Register Clock B (This clock pulse marks that point in time when the 8-bit receive buffer storage section and the 8-bit instruction storage section of the circulating memories #2 and #1, respectively, are in the associated shift registers during the receive half cycle of the memories, and when the 8-bit transmit buffer storage section and the 8-bit instruction storage section of the transmit half-cycle of circulating memories #2 and #1, respectively, are in the 8-bit shift registers).
TTYC=Teletype Address Clock Signals
TC=Transmit Clock Signal (This clock signal identifies the transmitting half of the complete cycle of the circulating memory and comprises 512 bit lengths).
RC=Receive Clock Signal (This signal identifies the receive half-cycle portion of the circulating memory and comprises 512 bit lengths.
TRC=Transmit-Receive pulse which indicates to the system whether the serial memories are in their 512-bit transmit mode or in their 512-bit receive mode.
$LCT_X$=A Line Count Transmit Clock pulse which identifies that point in time when a baud is to be transmitted from the adapter to a particular Teletype machine.
$LCR_X$=Line Count Receive Clock pulse which identifies that point in time when the baud from a specific teletypewriter is to be transferred from the teletypewriter to its appropriate position in the 8-bit shift register of the second circulating memory.

(I) GENERAL DESCRIPTION OF INVENTION (A) Transfer of Data From TTY's to Adapter

Figure 1:
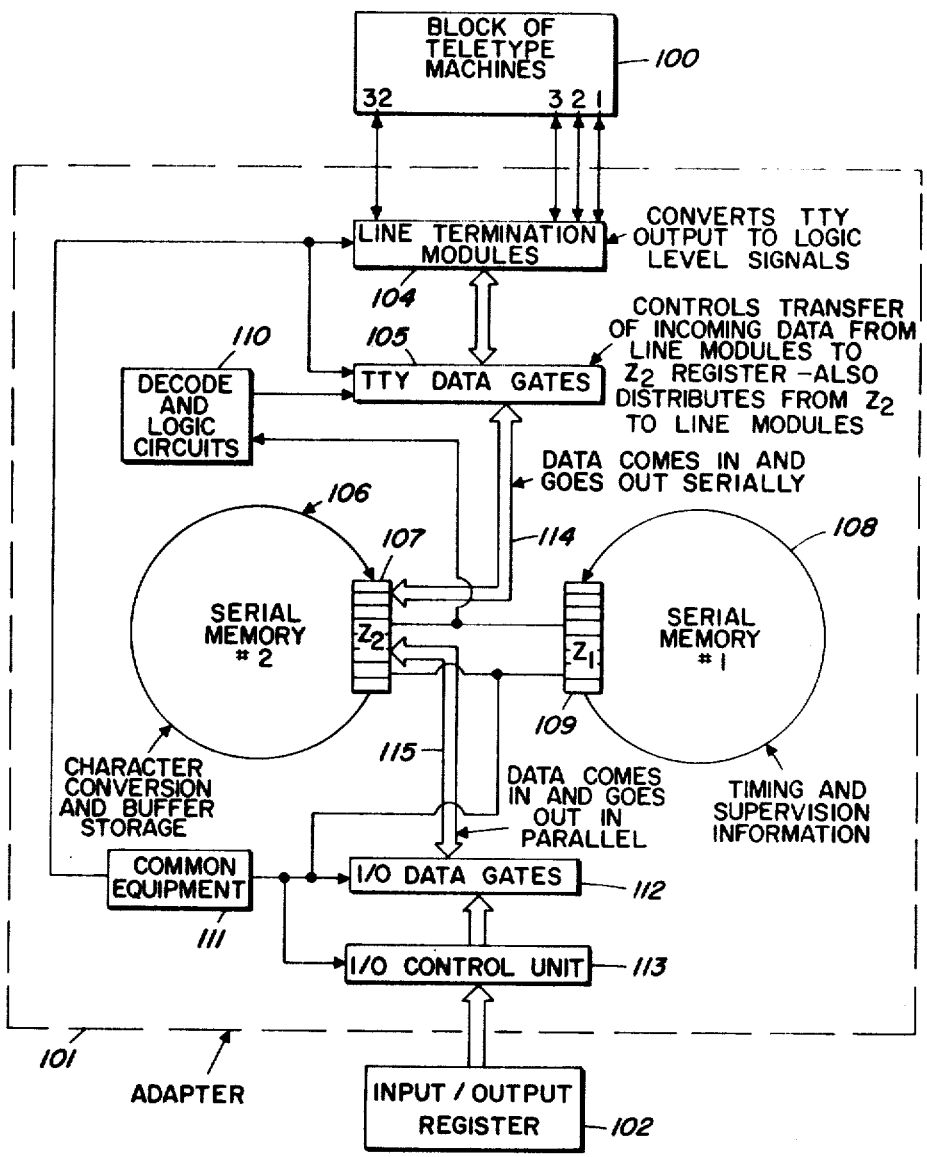

FIG. 1 shows a general logic diagram of the system with information being transferred back and forth between a block of Teletype machines 100 and a data processor input/output register 102 through the adapter 101; said adapter 101 forming the essence of the present invention.

The output from the block of Teletype machines 100 is supplied through line termination modules 104 which perform the dual function of changing the signal level of the output of the Teletype lines to the logic level employed in adapter 101, and conversely for changing the signal level of the data supplied from adapter 101 to that level used in Teletype machines 100. The line termination modules 104 also include gating and storage elements for received and transmitted data. For example, when data is being transmitted from the adapter to the Teletype machines storage means are necessary to change the data from pulse form, as it is generated in the adapter, to the much longer baud form employed by a Teletype machine.

The TTY data gates 105 function to control the transfer of incoming data from the Teletype machines to the Z2 shift register 107 of the serial memory 106. Said TTY data gates 105 also distribute the outgoing data from the Z2 register 107 to the Teletype machines. More specifically, the TTY data gate block 105 consists of a network of gating circuits which function to address the proper Teletype machine at the instant that the data to be transferred either to or from the Teletype machine, as desired, is occupying the Z2 register 107.

The information received from the Teletype machines, as mentioned above, is transferred through the line termination modules 104 and the TTY data gates 105 into the serial or circulating memory #2 which consists of a circulating memory portion 106 and an 8-bit shift register 107, also referred to as register Z2.

The serial memory #2 has a bit capacity of 1024 bits, 1016 of said bits being in the circulating delay line 106 and eight bits being in the shift register 107. As discussed hereinabove, the 1024-bit capacity of serial memory #2 is divided into two 512-bit sections, with one of said 512-bit sections being allocated to the reception of information from the Teletype machine, and the other 512-bit section being allocated to the reception of information from the input/output register 102 of the data processor, which information will be later transferred to the Teletype machine.

As mentioned hereinbefore, the serial memory #2 is designed to service 32 Teletype lines. Since there are 512 bits in both the received and the transmit section of the serial memory, each Teletype machine has allocated thereto 16 bits in the receive section and 16 bits in the transmit section. Each of these two 16-bit segments is divided into two 8-bit sections, as shown generally in chart form in FIG. 2.

More specifically, in FIG. 2A sections 122 and 123 each represent an 8-bit section of the 512-bit signal circulating in serial memory #2. The 8-bit section 122, identified as the assembly store section, receives in serial form the eight bits from a given Teletype machine, arbitrarily selected herein as line 1, in serial form over a period of time equal to the word rate of the Teletype machine. For example, if the Teletype machine has a word rate of 100 words per minute, then it will require somewhat just short of 100 milliseconds to assemble a word in section 122 of serial memory #2.

By appropriate means, to be described later under Section IX, a start pulse from the Teletype machine on line 1 is identified in the adapter and initiates a counting in the sample count of section 120. With each complete circulation of the serial memories #1 and #2, the sample count is incremented by 1. Since a complete circulation of a circular memory takes 1024 microseconds, or 1.024 milliseconds, it can easily be predicted from the sample count when the center of the individual bauds being received serially from Teletype machine #1, occur. For example, as shown in FIG. 3A, the first baud will occur at count 19, or approximately 20 milliseconds after the start pulse has been identified. The center of the second baud will occur at count 32 of the sample count; the third baud at count 46 of the sample count; the fourth baud at count 59 of the sample count; the fifth baud at count 72 of the sample count and the stop pulse at count 86 of the sample count.

Upon completion of the assembly of the word from the Teletype machine in the storage assembly store section 122, the said assembled word is transferred to the buffer store section 123, which is also an 8-bit section.

It is to be understood that throughout the specification the storage units and the counting sections as shown in FIGS. 2A, 2B, and 2C are continuously circulating through the circulating memories, and once during each complete circulation each 8-bit section will occupy one or the other of the 8-bit registers Z2 and Z1 of circulating memories 1 and 2. All transfer of data to and from both serial memories and the incrementing of counts in both serial memories is accomplished at the time that the particular circulating 8-bit character occupies its associated Z register.

Returning again to the discussion of the organization of the information in the circulating memories, as shown in FIG. 2, the assembled word in section 122 is transferred to the buffer storage section 123 upon completion of said assembly. Appropriate detecting means, to be discussed in detail later under Section VII, detect the count in the sample count section 120 and recognize that the word has been completely assembled. Proper control circuit means is then energized to delay the information in the assembly store section 122 for eight clock pulses, or eight microseconds, so that said assembled word will be shifted into the buffer store section 123.

In the charts of FIG. 2 the information is represented as going to the left so that the assembly store section 122 and the sample count section 120 will occupy the registers Z2 and Z1 in FIG. 1 before the buffer store section 123 and the instruction store section 121. Similarly, the distribution store section 125 of FIG. 2B and the distribution count section 124 will occupy the Z2 and Z1 registers before the buffer store section 127 and the instruction store section 126.

Returning again to the transfer of a word from the assembly store section 122 to the buffer store section 123, it is to be understood that the process of the assembling words can be going on in each of the 8-bit assembly store sections allocated to the 32 different Teletype machines at different levels of completion. In other words, each of the 16-bit sections in the circulating memory detects the start pulse from a Teletype machine whenever it should occur and is completely independent of the start pulse from any other of the Teletype machines in the system. Thus, at any given time the assembly of the words from the 32 Teletype machines can be at completely different levels of completion.

It is, however, necessary to transfer the data contained in the buffer storage section, such as buffer storage section 123 at periodic intervals of sufficient frequency to insure that the buffer store section will be cleared by the time the next assembly of a word from a given Teletype machine is completed. Since the fastest Teletype machine transmits words at a rate of 100 words per minute, it is necessary that the words contained in the buffer storage section 123 be transmitted to the input/output register 102 of FIG. 1 at regular intervals of less than 100 milliseconds. As will be discussed in some detail later, such transfer from the buffer storage section 123 to the input/output register occurs every 96 cycles of the serial memory. Since a complete cycle takes 1.024 milliseconds, 96 cycles requires 98 milliseconds, which is a sufficient rate to handle a 100-word per minute Teletype machine.

The instruction store section 121 is employed for supervisory functions. For example, it is necessary to inform the data processor that the buffer storage section 123 does actually contain a word received from a Teletype machine. In the event that such a word is not contained in a given buffer storage section 123, a dummy message is transmitted to the input/output register for that particular Teletype machine so that the information already stored in the data processor will not be altered. Consequently, at the time a word is transferred from the assembly store section 122 to the buffer store section 123, an activity bit is stored in a given one of the 8-bit positions of the instruction store block 121, which will be employed to determine whether the information contained in the buffer store section 123, or alternatively, the dummy character will be transferred to the input/output register at the time all the transfers from the buffer storage positions to the input/output register ordinarily occur, as will be discussed in detail later.

(B) Transfer of Data Between the Adapter and the Input/Output Register of the Data Processor Before proceeding with the discussion of the transfer of information from the serial memory #2 to the input/output register, it should be noted that the charts of FIGS. 2B and especially of FIG. 2C have not yet been discussed at any length. The reason is as follows. The chart of FIG. 2B relates to the transmission of information from serial memory #2 of the adapter to the Teletype machine and will not be discussed until after the general discussion of the transfer of information from the adapter to the input/output register and from the input/output register back to the adapter.

Referring now to FIG. 4A, there is shown the timing charts for transferring information from the serial memory #2 to the input/output register 102 of FIG. 1 and also for transferring information from said input/output register 102 back to the serial memory #2. Such transfer of information between the adapter and the input/output register occurs every 96 cycles of circulation of the circulating memories, which is equal to 98.304 milliseconds. Each transfer of data requires three separate operations and covers a time period of 1.088 milliseconds. These three operations are identified as $T_x$, $R_x$, and CRW in FIG. 4A. The operation $T_x$ occupies 512 microseconds and represents the transmission of data from the input/output register to the serial memory #2 to the appropriate character address of the transmit half of the circular memory #2. During the operation $R_x$ the data stored in the buffer storage section, such as section 123 of FIG. 2A of the receive portion of the circular memory #2, is transferred to the input/output register. During the operation CRW which requires 64 microseconds, a character request word (CRW) consisting of four 8-bit words, one bit for each of the 32 Teletype lines, is transferred to the input/output register of the data processor to notify the data processor that each particular buffer storage position, such as buffer storage section 127 in the transmit section of serial #2, is either clear and can accept another character from the input/output register for ultimate distribution to the associated Teletype line, or alternatively, is not clear and cannot accept another character. The means by which the character request word is assembled will be discussed in detail later. For the present, it should be noted that the character request word is stored in a memory unit separate from the circulating memories and specifically is contained in the decode and logic circuit 110 of FIG. 1.

Up to the present time the discussion has been limited to a single adapter with 32 Teletype lines being serviced thereby, and with a single input/output register of the data processor. It is possible, however, for a single input/output register to service as many as 32 adapters, each adapter having 32 Teletype lines thereon, for a total of 1024 Teletype machines for each input/output register. The means by which the servicing of the 32 adapters can be accomplished is shown in FIGS. 4A through 4G. It is accomplished, generally, by multiplexing the time intervals during which information is transferred from the adapter to the input/output register and from the input/output register to the adapter. More specifically, FIGS. 4A, 4B, and 4C, illustrate how the transfer of information between groups of four adapters is accomplished. For example, in FIG. 4B the data blocks 132 and 133 interleave with the data blocks 130 and 131 of FIG. 4A and with the data block 134 of FIG. 4C. Now, each of these data blocks can contain as many as four adapters, as shown in FIGS. 4D, 4E, 4F, and 4G, which show, in expanded form, the transmit portion $T_X$ of the data block 134. The adapters 29, 30, 31, and 32 of FIGS. 4D, 4E, 4F, and 4G can be seen to have the transmit portion interleave at four microsecond intervals, with the transfer to each buffer storage position, such as buffer storage 127 of FIG. 2B, occupying one microsecond in length. More specifically, the one microsecond clock pulse 135, for example, functions to transmit an 8-bit character from the input/output register to a buffer storage section 127 (FIG. 2B) of serial memory #2. Four microseconds later a one microsecond clock pulse 136 will function to transmit a single 8-bit character from the input/output register to the appropriate buffer storage section of adapter 30 corresponding to a buffer storage section 127 of FIG. 2B. In a similar manner pulses 137 and 138 transfer information from the input/output register to adapters 31 and 32. The cycle is then begun again with pulse 139 which transfers a second 8-bit character into the next succeeding buffer storage section 127 (FIG. 2B) of adapter 29. It can be seen from an examination of the waveforms of FIG. 4 that data is transferred from the input/output register for all 32 lines of each of the four adapters 29 through 32 during the transmit portion $T_X$ of the pulse 134 of FIG. 4C.

(C) Transfer of Data From the Adapter to the Teletype Machines

As soon as the block of characters have been transferred from the input/output register 102 of FIG. 1 to the buffer storage section, such as section 127 shown in FIG. 2B of serial memory #2 (FIG. 2B), such block of characters are transferred to the distribution storage area section 125 for distribution to the Teletype machine. It is to be understood that a maximum of 32 characters can be transferred from input/output register 102 to serial memory #1 of FIG. 1 during any one transfer operation. Usually, however, less than 32 characters will be transferred since all of the 32 transmit buffer store sections of serial memory #1 will not normally be cleared at the time of each transfer. More specifically, a transmit buffer store section such as section 127 in FIG. 2B cannot be cleared until the previous character in the distribution store section 125 has been distributed to the Teletype machine.

At the end of the transfer of information from input/output register 102 to serial memory #2 in FIG. 1, the characters stored in the buffer store sections 127 of FIG. 2 are transferred to distribution store sections 125 and distribution to the Teletype machines begins. The distribution to the Teletype machines is controlled by a distribution count section 124 which performs a timekeeping function very similar to that of the sample count section 120 of FIG. 2A. More specifically, as soon as the characters are transferred to the distribution store sections 125, a start pulse signal is distributed to the appropriate Teletype machines, with each individual distribution store section being associated with the single Teletype machine as discussed before. At the same time counting in the corresponding distribution count sections 124 is initiated and is incremented by one each complete cycle of the circular memory #1.

At predetermined counts in each distribution count sections 124, succeeding bits of the corresponding distribution store section are transferred to the addressed Teletype machines through appropriate gating and pulse forming circuits, such as TTY gates 105 and termination circuits 104 of FIG. 1.

In the case of a 100 word-per-minute Teletype machine the distribution times are shown in FIG. 3B, with the start pulse being transmitted at the count of zero, the first baud being transmitted at the count of 13; the second baud at the count of 26; the third baud at the count of 39; the fourth baud at the count of 53; the fifth baud at the count of 66; the stop pulse at the count of 79; and a completion pulse at the count of 97. Since each count represents 1.024 milliseconds, it can be seen that the count in each case represents a figure just slightly less than the actual number of milliseconds, which are shown in FIG. 3B.

At the completion of the distribution, that is, count 97 in the case of a 100 word-per-minute Teletype machine, a signal is supplied to a control circuit from the timekeeping distribution count section 124 of FIG. 2B, indicating a completion of distribution and calling for a transfer thereto of another character from the buffer store section 127 (FIG. 2B). The signal stored in the buffer store section 127 is then transferred to the distribution store section 125 and a character request bit is stored in a separate memory, to be discussed in detail later, indicating that that particular buffer store section is empty and can receive another character from the input/output register.

As discussed above, at the time of the next transfer between the adapter and the input/output register, a completed character request word composed of one character request bit from each Teletype line will be transferred to the input/output register instructing the data processor as to which transfer buffer storage sections, such as section 127 of FIG. 3B, is empty and in condition to receive a character from the input/output register. Then, on the next succeeding transfer of characters between the adapter and the input/output register the data processor will transfer characters only to those transfer buffer storage sections in serial memory #2 which have been identified as being empty by the character request word.

(D) Timing, Decoding, and Logic Circuits of the System

The common equipment portion 111 of FIG. 1 provides those facilities which are shared by the adapters when a plurality of adapters are used. Specifically, the common equipment 111 provides a one-megacycle clock source for all timing within the adapter, including timing for serial memories #1 and #2 and also the logic circuits of block 110, and further provides the timing signals required to initiate and supervise data block transfers between the adapter 101 and the input/output register 102.

The one-megacycle clock within common equipment 111 preferably is a stable, crystal-controlled oscillator which provides squarewave clock pulses at one microsecond intervals.

In adapter 101 the principal timing section consists of a 10-stage line counter driven from the one-megacycle clock. The output of said line counter is decoded by logic circuits within block 110 to define the timing periods required for serial memory access and for internal data transfer operations.

Worded in another way, the line counter will function to access the Z registers of the circular memories during those one microsecond bit intervals when each successive 8-bit character is occupying the eight stages of the Z shift registers, and at the same time, will address either the proper Teletype machine or the input/output register to make the proper transfer of data in accordance with the instructions from the control circuits.

The decode and logic circuits of blocks 110 of FIG. 1 are shown as a single block in FIG. 1. In the more detailed logic diagrams of the system, however, the decode and logic circuits are intermingled with other portions of the system. Such decode and logic circuits will be described in detail as the description of the specification proceeds.

The input/output control unit 113 of FIG. 1 is composed of the functional units illustrated in FIG. 16. Such units include the buffer and parity circuits 150, control decoder circuits 151, and control responsive circuits 152. Timing signals for the input/output control unit of FIG. 16 are furnished by the common equipment 111′.

Up to three input/output control units can be implemented in the adapted depending on the number of processors serviced. Dual or triple processor interface allows "hot standby" or "shared load" servicing of data communication lines.

In the output control unit of FIG. 16 incoming and outgoing data bytes (a character) are stored temporarily in a buffer storage contained within block 150. Such storage is necessary to provide synchronization with the input/output channel accessed through gate 153, and further to compensate for delay time in cabling. A parity bit is added to data being transferred to the input-output channel. Also, a parity count is made on data coming from the input/output channel. If a parity error is detected within block 150 in a data byte from the input/output channel, a signal is sent to the control response circuit 152, which stores an error signal for transmission to the input/output channel.

The control decoder 151 monitors the input/output channel control lines and examines the data buffer register contained within block 150 for supervisory instructions. Upon receiving a supervisory command, the appropriate control signals are passed on to the control response circuit 152. When the response circuit 152 receives the signal from the decoder 151, it will send the appropriate signals to the input/output channel.

(II) LOGIC CIRCUIT FOR RECEIVING DATA FROM TELETYPE MACHINES TO ADAPTER (FIG. 5)

Figure 5:
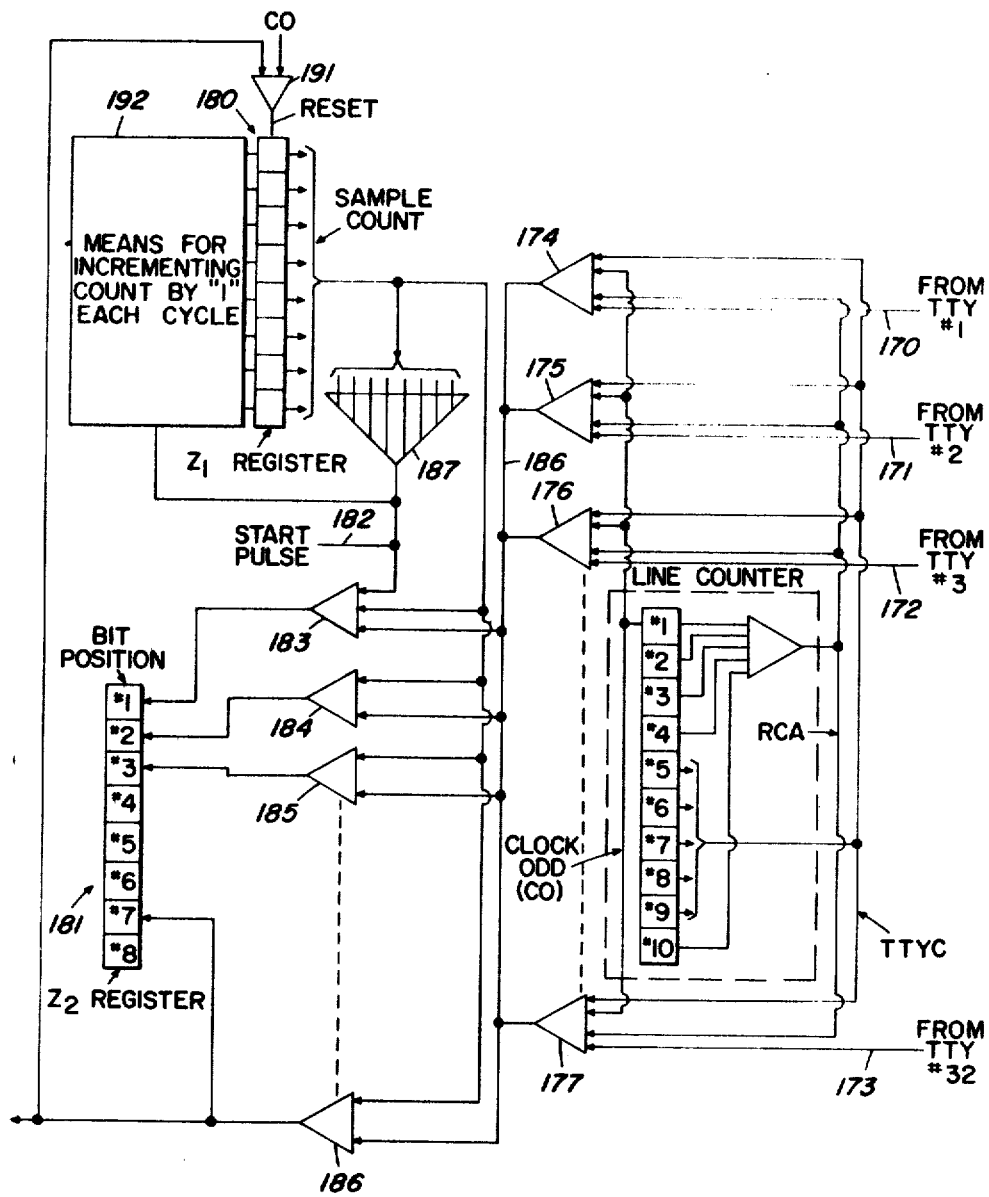
FIG. 5 shows logic employed to transfer information from the Teletype machine to the receive buffer storage sections of the second circulating memory of the adapter.

In FIG. 5 the inputs from the various Teletype machines are supplied to input leads 170, 171, 172, and 173 through line termination modules such as module 104 of FIG. 1 which converts the TTY output signals to the proper levels for use in the adapter.

Thirty-two TTY data input gates such as gates 174, 175, 176, and 177 are associated individually with each of the 32 Teletype lines. Each of these AND gates such as AND gates 174 through 177 are addressed once during each pass of the 512 bit receive section of the serial memories. Such addressing of AND gates 174 through 177 occurs only during the time periods when the assembly store memory sections of serial memory #2, such as assembly store 122 of FIG. 2A are in the Z register 107 of FIG. 1. Such addressing is done with aid of 10-stage binary line counter 183.

Since the line counter 183 is used in all four data transfers, i.e., from TTY's to adapter, from adapter to the input/output registers, from the input/output registers back to the adapter, and from the adapter to the TTY's, a detailed discussion of the line counter will be set forth now before proceeding with the discussion of the logic diagram of FIG. 5.

In FIG. 14, which shows the line counter organization, there are five output terminals 199, 200, 201, 202, and 203. The first four output terminals 199 to 202 function to address the four 8-bit memory sections associated with any given Teletype line and the signal appearing on output lead 203 functions to address a given Teletype line.

The function of each of the clock pulses appearing on the five output lines will now be set forth below. The clock pulse appearing on output lead 199, identified as clock pulse RCA, occurs each time an assembly store section such as section 122 of FIG. 2A appears in the Z2 register and a sample count section, such as section 120, occurs in the Z1 register. It is at this time that the bauds from the addressed Teletype machines are transmitted from the Teletype machines to the assembly store section of serial memory #2, for those Teletype machines that are transmitting data. It is to be understood that each individual assembly store section is uniquely associated with a given Teletype machine which is addressed at the proper time by the address appearing on output lead 203. The clock pulse appearing on output lead 199 and the address appearing on lead 203 are then employed to open a gate (not shown in FIG. 14) which will permit the baud to flow into the assembly store section. Other gating means (also not shown in FIG. 14) under the control of the sample count section direct the flow of any particular baud from the transmitting Teletype machine into the correct bit position in the assembly store section, as will be discussed in detail later.

The clock signal appearing on output lead 200 and identified throughout the specification as RCB is a Z register receive clock signal and occurs at the time the received buffer storage section, such as section 123 of FIG. 2A is in the Z2 register and the instruction store section, such as section 121 of FIG. 2A, is in the Z1 register. The bytes stored in the buffer store sections 123 have been transferred there upon the completion of assembly in section 122 and periodically will be transferred to the input/output register of the data processor. Thus, the transfer of the characters in the receive buffer storage sections 123 are under control of the clock pulses appearing on output lead 200 and also under the control of periodically occurring timing pulses, such as pulse 130 of FIG. 4A, which together open a gating means (not shown in FIG. 14) and permit the flow of information from the buffer storage section 123 into the input/output register.

The clock pulse appearing on output lead 201 is identified as the Z register transmit clock signal A (TCA) and is employed to access the transmit buffer storage memory section, such as memory section 127 of FIG. 2B, for the purpose of permitting transfer of bytes from the input/output register to said transmit buffer storage memories. The TCA signal in combination with the transmit pulse $T_x$, such as shown in time interval 130 of FIG. 4A, function together to open AND gates to be discussed later which will permit the flow of information from the input/output register, in parallel form, into those transmit buffer storage sections 127 which are clear and able to receive a character.

The clock signals appearing on output lead 202 is herein defined as the Z register transmit clock pulse B (TCB) and is employed to access the distribution store sections, such as memory section 125 of FIG. 2C, and thereby permit the transfer of individual bits stored therein to the appropriate Teletype machine. The clock signal TCB, in cooperation with the Teletype address signal appearing on output lead 203, function together to open AND gates to be discussed later, which will direct the information stored in the distribution store section 125 to the appropriate Teletype machine. Since the information stored in the distribution store section is transferred to the Teletype machines in serial manner, the particular bit which is to be transferred at any given time is determined by the count in distribution count section 124, which appears simultaneously in the Z1 register 109.

The specific means by which the clock pulses are produced on output leads 199 through 203 can be understood from an examination of the 10-stage binary bit counter 205, and the logic circuitry including AND gates 190 through 196, and inverters 197 and 198.

Referring now to the 10-stage battery counter 205, stage #1 represents the lowest significant digit and stage #10, the highest. The counter has a capability of counting to $2^{10}$ or 1024. The first three stages have their outputs connected to AND gates 195 and 196, and the fourth stage has its output connected directly to AND gate 195 and also connected to AND gate 196 through inverter 197. At every eighth clock pulse, i.e., every eight microseconds, the outputs of the first three stages will all be zero, which condition will define that point in time when a new block of eight bits has moved into the Z1 and Z2 registers of serial memories #1 and #2. Since data is originally transferred from the Teletype machines to the Z2 register of serial memory #2 when the first three stages of line counter 205 are zero, it follows by definition that such information will always reoccur in the Z2 register under the same condition. The fourth stage will alternate between a space and a mark every eight counts of the input even clock pulse CE and identifies which of the two 8-bit memory sections of any given 16-bit memory segment associated with any given Teletype machine, is in the Z2 register. More specifically, when stage #4 of line counter 205 contains a zero, an assembly store section 122 (FIG. 2A) is occupying the Z2 shift register 107 during the 512-bit receive section of the serial memory cycle. During the 512-bit transmit section of the cycle the distribution store section, such as section 125 of FIG. 2B, will occupy the Z2 register. The sample count block 120 and the distribution count block 124 of FIG. 2 will occupy the Z1 register during the times that the assembly block section 122 and the distribution store section 125, respectively, occupy the Z2 register.

During the alternate eight microseconds, the output of stage #4 of line counter 205 will be a binary "1" so that AND gate 195 will be disabled. However, such "1" is inverted by inverter 197 to enable AND gate 196 when the outputs of stages 1, 2, and 3 are again zero.

Thus the output of AND gates 195 and 196 produce alternate pulses every eighth microsecond. The pulses from AND gate 195, which access the "A" portions of the 16-bit memory segments, are supplied to AND gates 190 and 192 and the output from AND gate 196, which accesses the "B" sections of the 16-bit memory segments, is supplied to the input of AND gates 191 and 193. It is when one of the AND gates 190 through 193 is conductive that information is passed between the adapter and the input/output register.

Some means must be provided to distinguish between the 512-bit receive section of the serial memories and the 512-bit transmit section. Such distinction is made by utilizing the output of stage #10 of line counter 205, which output changes state every 512 bits, or every 512 clock pulses. By definition, when the output of stage #10 is a zero, AND gates 190 and 191 are conditioned to be opened to permit transfer of information from the Teletype machine to the adapter, and from the adapter to the input/output register. Conversely, when the output of stage #10 is a "1" (one), gates 190 and 191 are closed, and gates 192 and 193 are open (conductive) due to the effect of inverter 198. As discussed before, the output of gates 192 and 193 permit the flow of information from the input/output register to the adapter and from the adapter to the Teletype machines. By the arrangement of logic in FIG. 14, as discussed above, it can be seen that the clock signals appearing on output terminals 199 through 202 function to access the Z2 register of serial memory #2 at four different discrete times, corresponding to the four 8-bit sections associated with any given Teletype machine. The output from the gate 194 addresses the desired Teletype machine, as discussed above.

Stages 5, 6, 7, 8, and 9 of line counter 205 are employed to address the 32 Teletype lines in sequential order. More specifically, stage #5 represents the lowest significant bit in the group of stages 5 through 9 and changes state every 32 clock pulses, or every 32 microseconds. Consequently, the stages 5, 6, 7, 8, and 9 operate as a 5-stage counter which is incremented by one every 16 clock pulses. While the address for each Teletype machine will produce an output on lead 203 for 16 microseconds, transfer of data between any two of the Teletype machines, the adapter, and the input/output register occurs only when one of the leads 199 to 202 also has an output signal thereon, which output signal only exists for one microsecond, as will be discussed later.

The circuits are designed so that transfer of information actually occurs only on the transition of an output signal apearing on leads 199 through 202 from a lower level to a higher level; that is, during a negative to positive transition. With respect to AND gates 190 and 192, such output signal therefrom will coincide with the change in condition of line counter 205 which, in turn, is dependent on the positive transition of the clock even pulse as shown at time $t_1$ in FIG. 13A. In this manner, the transfer of information from the Teletype machine to the adapter is controlled by the signal on lead 199 and the transfer of information from the input/output register to the adapter is controlled by the signal on output lead 201.

With respect to AND gates 191 and 193, which control the transfer of energy from the Z register to the input/output register and from the adapter to the Teletype lines, respectively, it is desired that the transfer occur near the center of the time period in which the 8-bit memory section occupies the Z register. To accomplish this the clock pulse is inverted to produce a second clock pulse identified as a clock odd pulse CO and shown in FIG. 13B. The positive transition of the clock odd pulse occurs 180 degrees from the positive transition of the clock even pulse and, consequently, lies in the middle of the time interval of the one microsecond time interval which any 8-bit character occupies the Z registers.

In order to simplify the discussion of the other figures of this specification, the outputs of the line counter of FIG. 14 will be employed, where needed, with the terminology shown in FIG. 14. The entire line counter organization will not be repeated in other figures herein. Only the outputs 199 through 203 will appear in the other figures. It is to be understood that the output 203 is actually a group of five leads and is utilized to address the separate ones of the 32 Teletype lines and for other purposes as indicated in the specification.

Returning now to a discussion of the structure of FIG. 5, the RCA output lead and the TTYC lead from the line counter organization are supplied to each of the AND gates 174 through 177, to condition said AND gates to access the assembly store sections corresponding to each of the 32 Teletype lines.

Since only one of the Teletype lines is addressed at any given time, all of the outputs of the AND gates 174 through 177 can be connected to a common output lead 187 which, in turn, is connected to an input terminal of each of AND gates, such as AND gates 183 through 186, the outputs of which are individually connected to the input terminals of the eight bits of the Z2 register 181.

As discussed above, the data received from the Teletype machines is received serially, one baud at a time with each received baud being stored in succeeding bits of the shift register 181 and at predetermined time, in accordance with the word rate of the Teletype machine. Both the time of receiving a baud from the Teletype machine and the particular bit of the Z2 register into which said baud is stored, are determined by the count contained in the sample count section of the serial memory #1, i.e., in the Z1 register 180 of FIG. 5 at the time the appropriate sample count section occupies said Z1 register. The eight AND gates 183 through 186 are individually responsive to particular counts of the sample count to pass a sampling of the received baud from the appropriate Teletype machine into the appropriate bit of the Z2 register 181.

For example, referring to FIG. 3A, the second baud 199 from a given Teletype line will be transferred into bit #3 of register 181 of FIG. 5 when the count 32 is contained in the Z1 register 180. At the count of 32 the gate 185 becomes opened to pass the baud from the selected Teletype machine through one of the AND gates 174 through 177 and stores said baud in the bit position #3 of Z2 register 181.

At the count of 46, as shown in FIG. 3A, the third received baud is stored in bit position #4 of register 181 of FIG. 5; at the count of 72 the fifth baud is stored in bit position #6; and at the count of 86 the stop pulse is stored in bit position #7. Bit position #8 is not used in this particular application of the invention to Teletype machines.

At the occurrence of the count of 86 in the Z1 register, there is shown in FIG. 3 means for shifting the character assembled in the Z2 register 181 into the buffer store section 123 of FIG. 2A, as will be discussed in detail later herein under the section heading, "Logic Circuit for Shifting Received Data from the Assembly Storage to Buffer Storage in Preparation for Transfer to Input/Output Register."

The output from the AND gate 186 at the count of 86 (FIG. 3A) also functions to condition AND gate 191 for conductivity at the next positive transition of the clock odd pulse CO which occurs 0.5 microsecond after the storage of data in bit position 7 of the Z2 register 181. The output of AND gate 191 functions to reset the count of the Z1 register 180 to zero in preparation for the next character assembly cycle.

Means are required to initiate the count in the sample count memory section, and once initiated, to increment said count by 1 each cycle of the serial memory #1. The initiation of the count in the serial memory is accomplished by the detection of a start pulse from the associated Teletype machine. The specific structure for detecting the start pulse is shown in FIG. 15 which will be discussed in detail later in the section entitled, "Logic for Detecting the Start Pulse from a TTY."

Generally speaking, said start pulse is determined by three successive samples of the output of a Teletype line, all of which show a space condition, which is the condition representing a start pulse. When three such successive samplings show a space condition, a start pulse appears on input lead 182 of FIG. 5, and is supplied to the means for incrementing the count by one, said means being identified as block 192. The specific means for incrementing the count by one are not shown in FIG. 5 but will be discussed in detail later herein in the section entitled, "Logic for Initiating Count and Timekeeping Counters and for Incrementing Stored Count by One Each Cycle of Operation." It is to be noted that the OR gate 187 is a part of a structure required for incrementing the count in the sample count memory section by one, as will be discussed in connection with FIG. 12.

(III) LOGIC CIRCUIT FOR TRANSMITTING DATA FROM THE ADAPTER TO THE TTY'S (FIG. 6)

Figure 6:
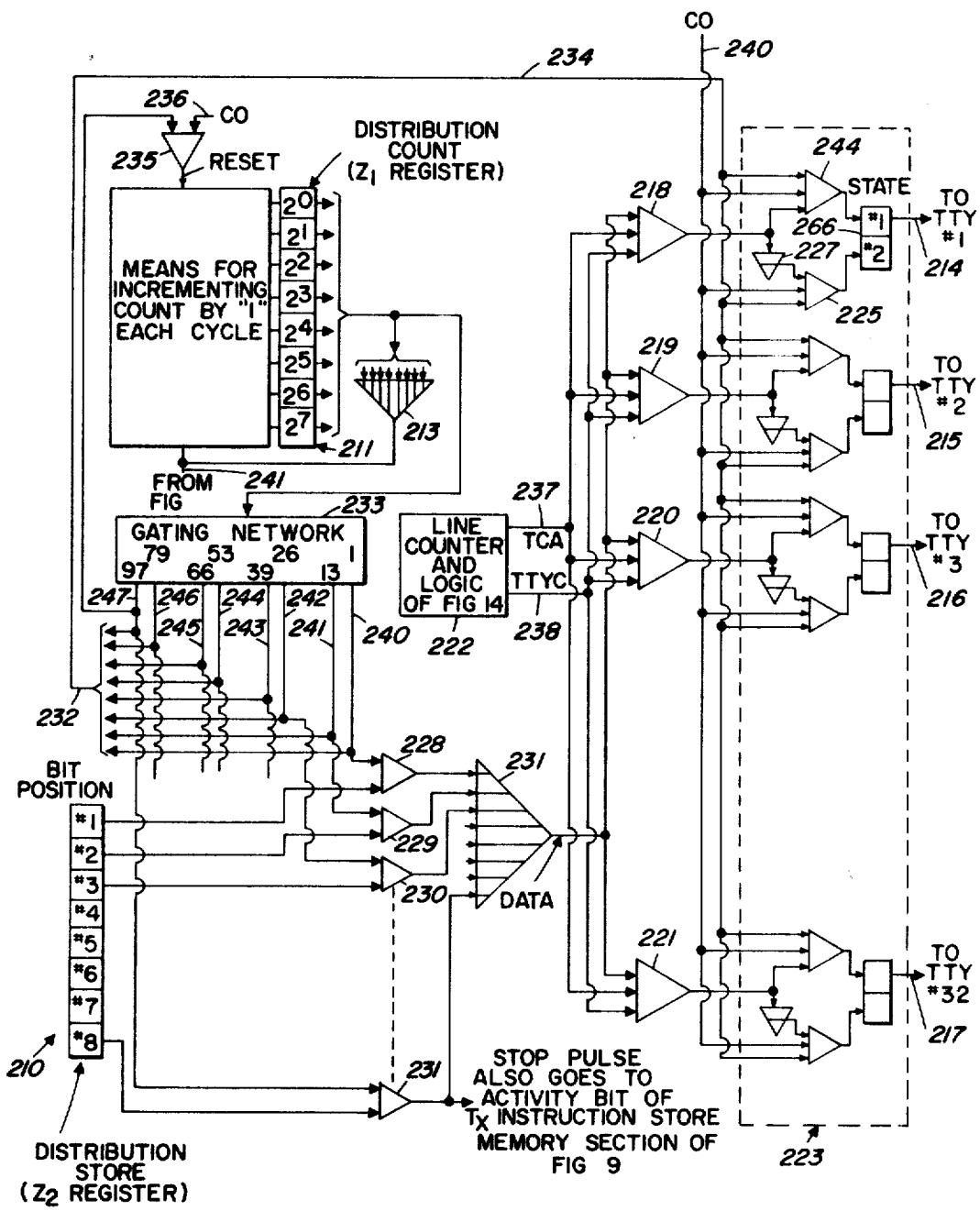
FIG. 6 shows logic employed to transfer words from the distribution storage sections of the second circulating memory to the Teletype machines.
Figure 9:
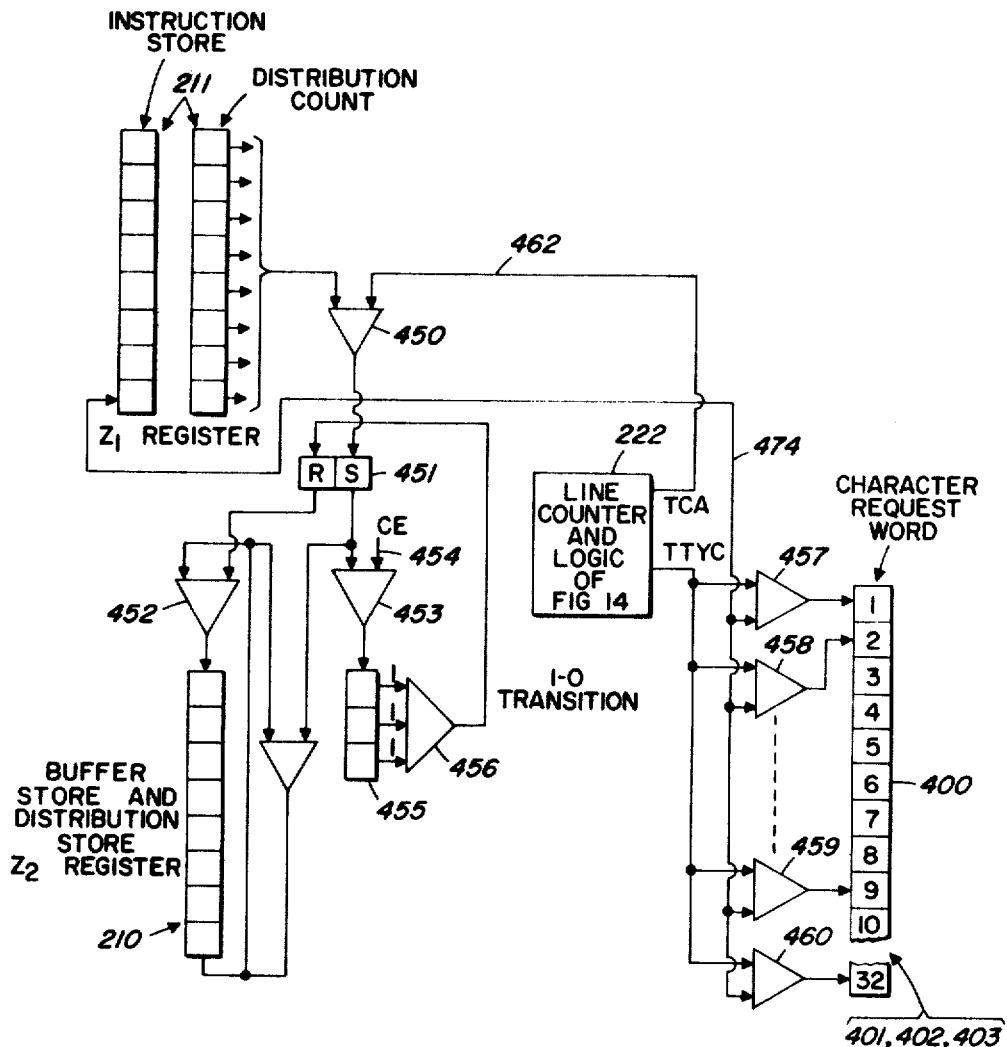
FIG. 9 shows the logic employed to advance the characters stored in the transmit buffer storage section to the distribution storage sections of the second circulating memory in preparation for transfer of said data to the Teletype machines.

Data from the input/output register is transferred to the transmit buffer storage sections of serial memory #1, such as buffer storage section 127 of FIG. 2B. Such characters are then shifted from the transmit buffer storage sections to the distribution store sections such as section 125 of FIG. 2B. The specific structure by which the transfer of information from the input/output register to the transmit buffer store sections and the shifting of information from the transmit buffer storage sections to the distribution store section are shown in FIGS. 7 and 9, respectively, and will be discussed in Sections IV and VI hereinafter. For the purposes of the present section assume that the information has been placed in the distribution storage section of serial memory #2 and that it is desired to distribute such information from serial memory #2 to the Teletype machines. In FIG. 6 the Z2 register of serial memory #2 is identified by reference character 210 and, of course, is the same as Z2 register discussed in connection with FIG. 5, except that the consideration of the Z2 register in FIG. 6 is at those times when the Z2 register is occupied by the distribution storage sections rather than the assembly storage sections.

The distribution of the characters from the Z2 register to the Teletype machines is effected in a serial manner with respect to each Teletype machine, with each Teletype machine being poled every 16 microseconds during the 512-bit transmit section of the circular memories.

Each Teletype machine is addressed in sequential order by the output of the line counter and associated logic circuit within block 222, which was discussed in detail in FIG. 14. The output signal TCA appearing on output lead 237 of line counter 222 is supplied to an input of each of the 32 AND gates 218 through 221 and accesses the Teletype machines at the precise time that the distribution store memory sections occupy the 8-bit Z2 register 210. The addressing of a specific Teletype machine is accomplished by the 5-bit address TTYC appearing on output lead 238 of line counter 222. Such address signal TTYC opens one of the AND gates 218 through 221 in sequential order every 16 microseconds for the complete 1024-bit cycle of the serial memory. The TCA signal on output lead 237, however, produces output signals only during the 512-bit transmit section of the cycle of the serial memories.

As in the case of assembling information, it is necessary that distribution of data in the Z2 register 210 be done serially, with the start pulse, which is stored in bit position #1, being supplied to the Teletype machines first. Next the bauds which are stored in bit positions 2, 3, 4, 5, and 6 are supplied at predetermined, subsequent time intervals. Finally, the stop pulse which is stored in bit position #7 is supplied last.

Both the bit position and the particular time that the bit stored in said bit position is supplied to the Teletype line is determined by the count of the distribution count memory section contained in the X1 register 211. Reference is made to FIG. 3B which shows the particular count of the distribution count section required to distribute a word to a Teletype machine having an operating speed of 100 words-per-minute. In FIG. 3B it can be seen that the start pulse is transmitted at the count of zero. The first baud is transmitted at the count of 13, the second baud at the count of 26, the third baud at count of 39, the fourth baud at the count of 53, the fifth baud at the count of 66, the stop pulse at the count of 79, and a completion pulse at the count of 97. Since the counts 0, 13, 26, 39, 53, 66, 79, and 97 occur on the positive transmission of the appropriate clock even pulse CE, a one microsecond pulse is created on the output leads 240 through 247, respectively, of gating network 233 (FIG. 6). Said gating network 233 consists of a plurality of gates which are constructed to respond to the particular count combinations 0, 13, 26, 39, 53, 66, 79, and 97.

When they occur, the microsecond pulse on output leads 240 through 247 energize selective ones of the gates 228 through 231 to pass data through OR gate 231 to inputs of all the AND gates 218 through 221, only one of which is energized during the occupation of the Z2 register by an particular distribution store section.

Since the data pulse appearing at the output of one of the AND gates 218 through 221 is only one microsecond long, some means must be provided to translate such one microsecond data pulses into the much longer bauds shown in FIG. 3B. Such a means is contained within the dotted line 223 and constitutes part of the line termination module 104 of FIG. 1.

The basic function of the logic within block 223 is to respond to the concurrence of the output signal of the selected gate of gates 218 through 221, the one microsecond mark appearing on lead 234, and the positive transition of the clock odd pulse supplied through lead 240 to flip a bistable circuit, such a flip-flop 226 to either of its two stable states. More specifically, if a binary one (a mark) appears simultaneously on lead 234 with the output of gate 218, for example, then upon the occurrence of the positive transition of the clock odd pulse CO, the gate 224 will pass a pulse to flip-flop 226 to cause said flip-flop 226 to assume its #1 state which will arbitrarily be defined as then containing a binary bit 1.

On the other hand, if the output of AND gate 218 is a binary bit 0, then upon the occurrence of a binary bit 1 on lead 234 and the positive transition of the clock odd pulse on lead 240, the AND gate 225 will be energized to cause flip-flop 226 to assume its #2 condition to produce a binary bit zero on output lead 214. It is to be noted that the inverter 227 inverts the output of AND gate 218 to an upper level, or binary bit 1 condition, thus conditioning gate 225 to be opened upon the occurrence of a 1 on lead 234 and the positive transition of the clock odd pulse.

Since a one microsecond pulse appears on lead 234 only during the counts 0, 13, 26, 39, 53, 66, 79, and 97 of the distribution count memory section 211 the flip-flop 226 will maintain its state during the entire baud period and will, in fact, be supplied directly to the Teletype line through suitable signal level interfacing means, however.

The count in the distribution count memory section 211 is initiated with each transfer of the character stored in the transmit buffer store section 127 of FIG. 2B to the distribution store section 125. By circuit means which will be described later, such a transfer results in a pulse being supplied to the lead 241 of FIG. 6 which pulse actually initiates the counting in the distribution count memory section.

Figure 7A:
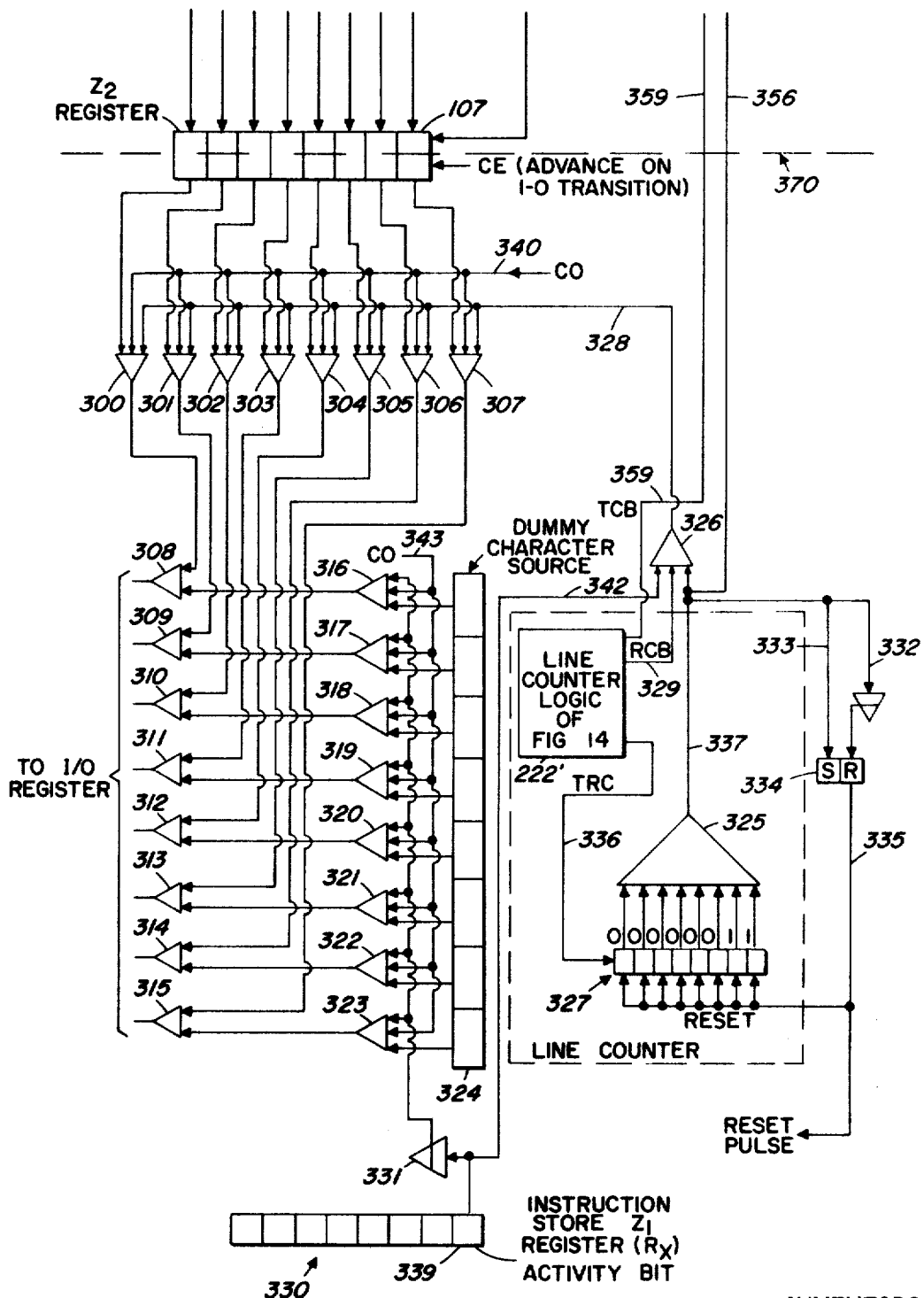
FIG. 7A shows logic for transferring data from the adapter to the data processor.

(IV) LOGIC CIRCUIT FOR TRANSFERRING DATA FROM THE ADAPTER TO THE INPUT/OUTPUT OF THE DATA PROCESSOR REGISTER AND FROM THE INPUT/OUTPUT REGISTER TO THE ADAPTER (FIGS. 7 AND 7A)

FIG. 7 shows the logic employed to transfer data from the input/output register 350 to the Z2 register 107. FIG. 7A shows that logic required to transfer information from the Z2 register to the input/output register. An exception is the logic within the dotted rectangle 371 which is common to both the logic of FIG. 7 and FIG. 7A and functions as a common timing circuit.

The logic comprising inverter 332 and flip-flop 334 is responsive to the output of the timing circuit to perform a reset function, as will be discussed later, and also to provide the signal calling for transmission of the character request word, which is stored in the control circuitry of the adapter, to the input/output register. As discussed hereinbefore, the character request word is a 32-bit word broken down into four 8-bit words which function to inform the input/output register as to which of the transmit buffer storage memory sections are clear and therefore in a condition to accept a new word at the next input/output register to adapter transmission.

(A) Transmission of data from input/output register to adapter

The logic of FIG. 7 will be discussed first, since the input/output register to adapter transfer occurs first, as can be seen from the timing block of FIG. 4A.

For each 1024 one microsecond clock pulses, the TRC lead 336 will cycle once, as discussed in connection with the line counter organization logic of FIG. 14. A seven-stage binary counter 327 is constructed to respond to each one-to-zero transitions of the TRC pulse. An AND gate 325 is responsive to the 96th count of counter 327 to produce an output on lead 337. Such output pulse will exist on output lead 337 for 1024 microseconds which is until the next one-to-zero transition of the TRC pulse on input lead 336 occurs. Thus an output pulse (or *y* mark) will appear on ouput lead 337 of AND gate 325 for 1024 microseconds such as, for example, the 1024-microsecond period 130 of FIG. 4A. It should also be noted that the beginning of the 1024-microsecond period occurs at the time when all 10 stages of the line counter 222' change from a "1" condition to a "0" condition, which condition also contains the address of the first Teletype line in the transmit function. Thus, at this time the TCB clock pulse will appear on lead 359 from line counter 222' to condition AND gate 357. Further, since a mark appears on output lead 337 of AND gate 325, the other input lead of AND gate 357 is energized to produce a mark on output lead 364 of said AND gate 357, thus conditioning all of the gates 351 through 358 for passage of information when the signals on the other input leads of gate 351–358 meet certain requirements. Such requirements are, specifically, a transition of 1 to 0 of the odd clock pulse which appears on common lead 363 to AND gates 351 through 358. At this time the information stored in the input/output register 350 will pass through the AND gates 351–358 into the eight bit positions of the Z2 register 107. It is to be noted that the transmit buffer storage memory section 127 of FIG. 2B, is, at this time, occupying the Z2 register 107, since the TCB clock pulse has been designed to energize AND gate 357 during this particular one microsecond period.

Immediately before information is transferred from the input register 350 to the Z2 register 107, it is necessary to clear the Z2 register. However, clearance of the Z2 register should only occur in the event that information is to be transferred from the input register to the adapter. The occurrence of said transfer is determined by the information which has been previously transferred to the data processor in the character request word, a detailed discussion of such character request word being discussed later herein in Section VII.

Clearance of the Z2 register is accomplished by means of OR gate 358 and AND gate 349. Any data word transferred from the input/output register 350 will have at least one mark or "1" therein which will produce a mark on the output of OR gate 358. Then, during the upper level of the clock even pulse CE appearing on input lead 360 to AND gate 359, the said AND gate 359 will pass a clearing pulse to Z2 register 107 which clears said Z2 register. Then .5 microsecond later, during the 1 to 0 transition of the clock odd pulse appearing on input lead 363, the said AND gates 351 through 358 are opened to permit transfer of the data from input register 350 to the Z2 register 107.

It is to be specifically noted that the TCB clock pulse appearing on output lead 359 occurs every sixteen microseconds during the 512-bit transmit half of the serial memory cycle and, further, during the one microsecond in which the buffer store transmit memory section 127 of FIG. 2B is in the Z2 register.

(B) Transmission of data from adapter to input/output register

At the end of 512 microseconds, i.e., at the count of 511 in the line counter 222' (FIG. 7A), the TCB pulse will terminate and the RCB clock pulse on lead 329 will initiate and will exist for the next 512 even clock pulses which constitute the receive half cycle of the serial memories. The AND gate 326 will thus be conditioned by the RCB clock pulse and the output from AND gate 325, which is still energized, to produce an output on output terminal 328 only when an activity bit is present in bit position 339 of the receive instruction store memory section 330, as such instruction store memories are circulated through the Z1 register 330.

More specifically, the data stored in the receive buffer store memory section, such as memory section 123 of FIG. 2A, will be transferred from the Z2 register 107 through AND gates 300 to 307, when properly conditioned, and then through the OR gates 308 through 315 to the input/output register, as indicated in FIG. 7A.

Conditioning of AND gates 300 through 307 is under control of the output from AND gate 326, which output signal occurs every 16 microseconds simultaneously with the occurrence of a receive buffer store data word in the Z2 register 107. The AND gates 300 through 307, however, are not actually opened to permit transfer of information therethrough until the 1-to-0 transition of the odd clock pulse CO appearing on input lead 340. At such a transition AND gates 300 through 307 are opened to permit transfer of the data word from the Z2 register 107 through the OR gates 308 through 315 to the input/output register of the data processor.

On those occurrences when the receive buffer store memory sections do not contain a stored data word, a dummy word, which is permanently stored in 8-bit memory section 324, is transferred to the input/output register and then to the data processor which responds to said dummy word in a suitable manner. The particular manner in which the data processor responds to such dummy word is outside the scope of this invention, but generally functions to ignore such dummy word and leave the contents of the associated memory addresses of the data processor unchanged.

As indicated briefly above, the determination as to whether the dummy character or the contents of the Z2 register should be transferred to the input/output register is under control of the presence or absence of an activity bit contained in the bit position 339 of the receive instruction store memory section contained in the Z1 register 330. If an activity bit is present this means that a date word has been stored in the receive buffer store memory section and should be transferred from the Z2 register to the input/output register. Such an instruction is carried out via lead 342 which extends from bit position 339 to the third input of AND gate 326 to complete the energization of AND gate 326 and provide an output pulse on output terminal 328 thereof, and thereby activate AND gates 300 through 307 at the appropriate time.

On the other hand, if the bit position 339 of the receive instruction store of memory section contained a zero, i.e., does not contain an activity bit, then the zero will be inverted by inverter 331 to produce a mark or a "1" on one of the input terminals of AND gates 316 through 323 to condition said AND gates to transmit the dummy character stored in the permanent memory section 324. Then upon occurrence of a 1-to-0 transition of the odd clock pulse applied to input lead 343, the dummy word contained in permanent memory 324 will be transferred to the input/output register through AND gates 316 through 323 and OR gates 308 through 315.

At the same time, the lack of an activity bit in bit position 339 will cause AND gate 326 to be nonconductive so that no signals will appear on the output terminal 328 thereof.

(C) Generation of Character Request Word Instruction Pulse

At the end of the transfer of data from the adapter to the input/output register, as shown in FIG. 4A, the character request word CRW is transmitted from a separate storage means in the adapter to the input/output register. Some instruction means is required, however, to indicate the end of the $R_X$ transfer and to initiate the transfer of the character request word from the adapter to the input/output register.

Such instruction is a pulse generated at the end of the $R_X$ transfer by means shown in FIG. 7A. More specifically, when the counter 327 initially changes to count 96, which is the condition shown in FIG. 7, the flip-flop 334 is caused to assume its "set" condition in response to the mark condition on the output of AND gate 325. 1024 microseconds later when the counter 327 changes from count 96 to count 97 and the output of AND gate 325 changes back to a space, the flip-flop 334 will be changed to a reset condition due to the effect of inverter 332. When the flip-flop 334 changes to a reset condition a zero-to-one transition will occur on the output lead 335 from flip-flop 334. Such zero-to-one transition functions to reset counter 327 to zero and also functions to initiate transfer of the character request word from its separate storage means (not shown in FIG. 7A) to the input/output register. The detail logic of the storage means for the character request word and also the logic for effecting transfer of such word to the input/output register is shown in FIG. 10 and will be discussed in the next Section V.

Figure 10:
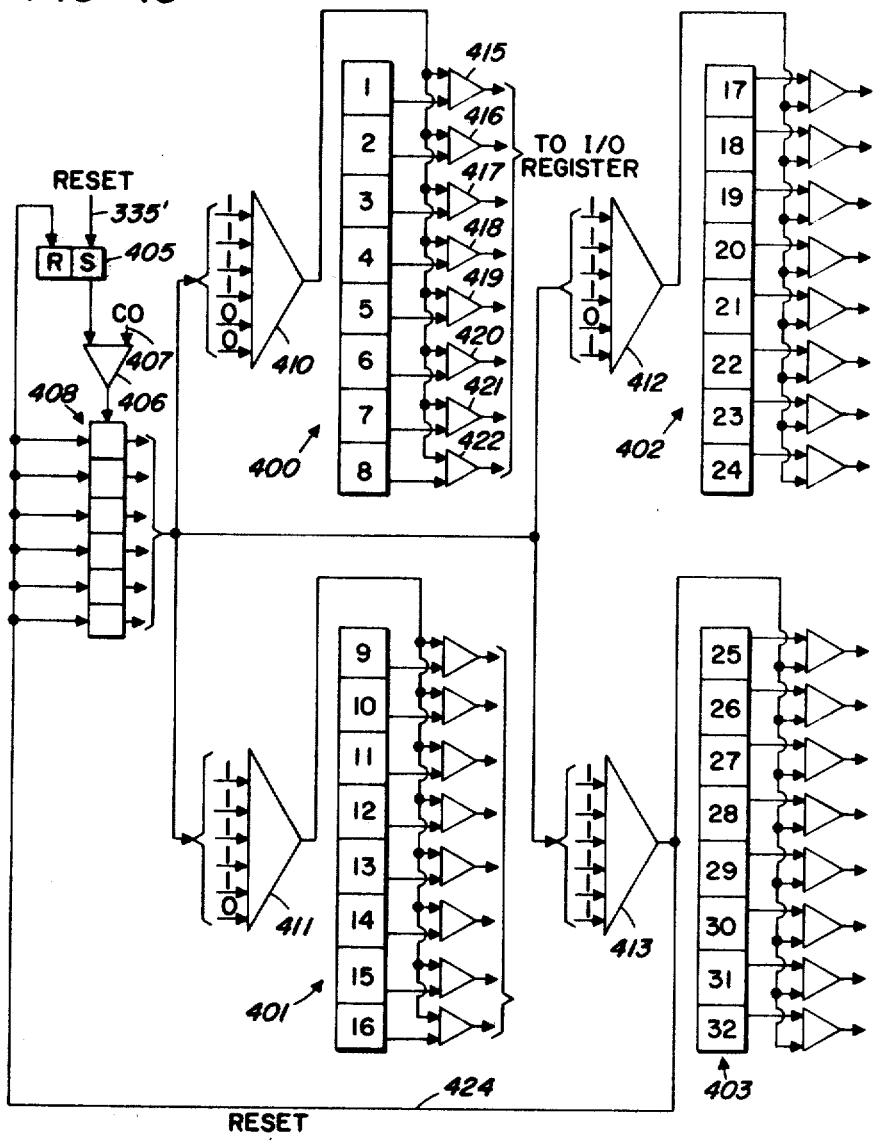
FIG. 10 shows the logic required for storing the character request word and for subsequently transmitting said character request word to the data processor.

(V) LOGIC CIRCUIT FOR ASSEMBLY AND TRANSMISSION OF CHARACTER ASSEMBLY WORD FROM ADAPTER TO I/O REGISTER (FIG. 10)

In FIG. 10 there are shown four storage means 400, 401, 402, and 403 each capable of storing eight bits. These four storage means are separate from the serial memory sections and function to indicate the status of each transmit buffer storage memory section of the 32 Teletype lines. For example, the bit position 23 in storage unit 402 of FIG. 10 contains a "1" or a "0" indicating a cleared condition or a noncleared condition for the transmit buffer storage section, as shown in FIG. 2B, associated with the 23rd Teletype line.

The data in the character request word is compiled in the following manner. As the word stored in the transmit buffer storage memory section of a given Teletype line is transferred to the distribution store memory section, a bit is stored in the corresponding bit position of the storage means of FIG. 10. Thus, for example, using the 23rd Teletype line as an example, when a word in the transmit buffer storage memory section associated with the 23rd Teletype line address is transferred to the distribution store memory section, an activity bit is stored in bit position 23 of memory section 402.

The specific logic by which said activity bit is stored in the bit position 23 and also in the other 31 bit positions of FIG. 10 is shown in FIG. 1 and will be discussed later herein in Section VI. For purposes of discussion of FIG. 10, however, assume that a character word has been assembled in the storage memory of FIG. 10 and is to be transferred to the input/output register at the end of the $R_X$ transfer of FIG. 4A, the reset pulse appearing on output terminal 335 of flip-flop 334 in FIG. 7A is supplied, in FIG. 10, to the set side of flip-flop 405, thereby conditioning AND gate 406 to pass 0-to-1 transitions of the one megacycle odd clock pulse applied to input lead 407 of AND gate 406. A six-stage binary counter 408 will count in response to the 0 to 1 transitions of the odd clock pulse input, so that at intervals of 16 microseconds the data stored in the blocks 400 through 403 will be successively supplied to the input/output register. A 16-microsecond spacing is in keeping with the rate at which data is supplied to the input/output register from the Z2 register of the serial memory. In accordance with the foregoing, timing, AND gates 410, 411, 412, and 413, all of which are responsive to predetermined counts of the counter 408 are constructed to become conductive, respectively, at counts 15, 31, 47, and 63, which counts are spaced apart at 16-microsecond time intervals.

Each of the AND gates 410 through 413 is associated with one of the 8-bit storage means 400 through 403 and, more particularly, functions to open the eight AND gates in the output circuits of the individual bit positions of a storage means. For example, the output of AND gate 410 is supplied to one of the inputs of each of the AND gates 415 through 422. The other input to each of the AND gates 415 through 422 is connected to the output of one of the eight stages of the storage means 400. Thus, during the one microsecond the AND gate 410 is conductive, the AND gates 415 through 422 will also be conditioned to pass information contained in the storage means 400 to the input/output register.

In a similar manner, at 16-microsecond intervals the information stored in storage means 401, 402, and 403 will be passed to the input/output register.

At the completion of the transfer of the character request word, i.e., at the count of 63, when AND gate 413 is conductive, a reset pulse will be passed through output lead 424 to reset flip-flop 405 to disable AND gate 406 and terminate the operation of the character request word logic circuit. It should also be noted that the reset pulse also functions to reset counter 408 to a zero condition. A discussion of the actual assembly of the character request word will be contained in the next section.

(VI) LOGIC CIRCUIT FOR SHIFTING DATA FROM BUFFER STORAGE TO DISTRIBUTION STORAGE FOR TRANSMISSION TO TTY

As discussed above, advancement from the transmit buffer store memory section to the distribution store section occurs when the transmit distribution count reaches a certain value, such value usually occurring at the end of the stop bit of the baud being distributed to the particular Teletype machine being addressed.

When the distribution count reaches such value, the AND gate 450 of FIG. 9 will be opened by the coincidence of such given count from the Z1 register 211 and the occurrence of a TCA timing pulse on input lead 462 of AND gate 450. The output from AND gate 450 will set flip-flop 451 which will function to close AND gate 452 and open AND gate 453. Closure of AND gate 452 blocks the flow of information through the serial memory #2 and diverts said flow of information through AND gate 463, thus bypassing the Z2 register 210. Such bypass of the Z2 register 210 has the effect of advancing the data circulating in the serial memory #2 by eight microseconds or eight bit positions. Means are provided to insure that only the eight bits in the transmit buffer storage section are advanced to the distribution store section. The means insuring that only such eight bits are advanced include AND gate 453, counter 455, and AND gate 456. The AND gate 453 is conditioned to be opened when flip-flop 451 is set, so that the 1 to 0 transitions of the even clock pulse CE can pass through AND gate 453 to activate counter 455. The said counter 455 will count from its reset condition of "0" through seven counts at which time each state thereof will contain a "1." The AND gate 456 is constructed to be conductive and have a "1" on its output when the three stages of the counter 455 all contain a "1." Upon the eighth count the output of AND gate 456 will again return to a zero condition. It is this 1 to 0 transition which functions to cause flip-flop 451 to be reset and thereby open AND gate 452 and close AND gates 463 and 453, thus completing the advancement of an 8-bit word from the transmit buffer store memory section to the transmit distribution store memory section.

In order to advise the data processor that the transmit buffer store memory section is now clear and ready to accept a new word, an activity bit is stored in one of the 32 positions of the character request word 470, which has been discussed previously in Section V. The character request word is comprised of four 8-bit sections 400', 401', 402', and 403' with one bit position being associated with a given Teletype line addressed. Each of the 32-bit positions has an AND gate such as AND gates 457 through 460 associated therewith. Each of said AND gates is responsive to a particular Teletype address position and will function to place an activity bit in the proper bit position of the character request word storage means 470 if a transfer from the transmit buffer store memory section to the distribution store memory section is actually effected. Such a transfer is indicated to AND gates 457 through 460 through common lead 474 which connects the output of AND gate 450 to an input of each of AND gates 457 through 460.

(VII) LOGIC CIRCUIT FOR SHIFTING RECEIVED DATA FROM ASSEMBLY STORAGE TO BUFFER STORAGE IN PREPARATION FOR TRANSFER OF DATA TO THE INPUT/OUTPUT REGISTER

Once a word from a particular Teletype machine has been assembled in the appropriate assembly store memory section, it is necessary to transfer such assembled word to the receive buffer store memory section in preparation for transfer of said word to the input/output register.

The transfer or shifting of the assembled word to the received buffer store section requires a logic similar to that required for shifting a word stored in the transmit buffer storage memory section, to the distribution store memory section, except that in the case of shifting from the assembly store to the receive buffer store it is necessary to delay the word rather than advance the word as required in the transmit section.

Figure 8:
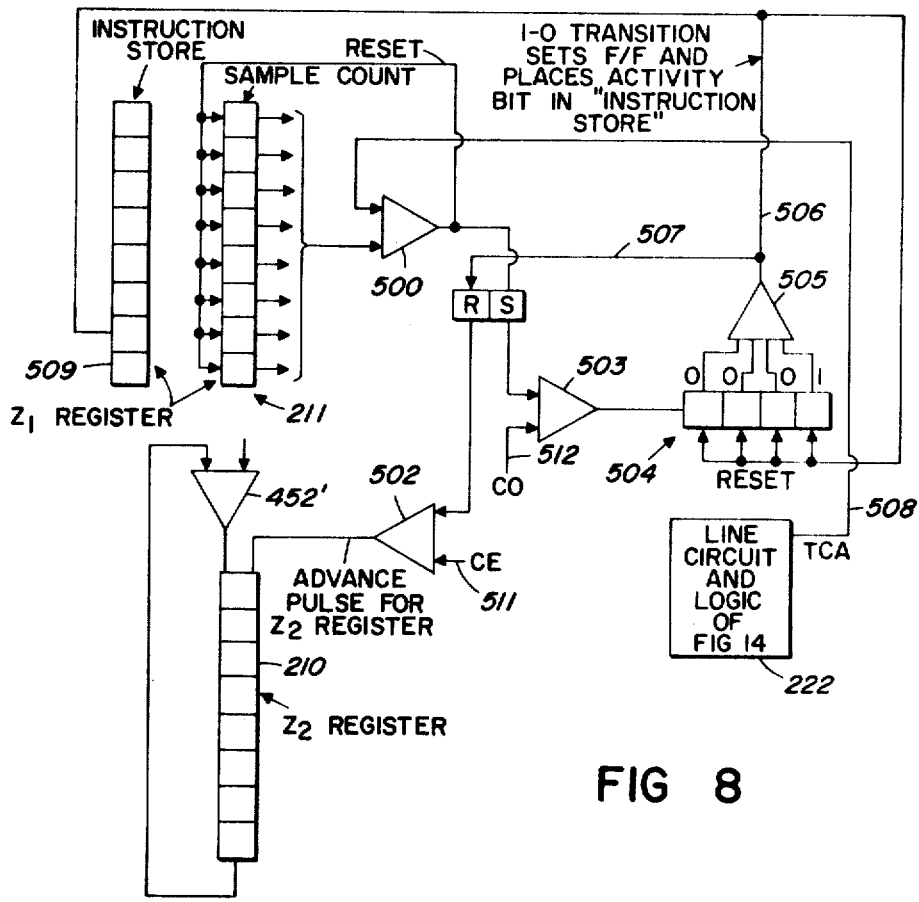
FIGS. 8 and 8A show the logic and timing chart for shifting words, assembled from a Teletype machine, from an assembly storage section to the receive buffer storage section.

Upon completion of the assembly of the word in the assembly store section, the sample count contained in the Z1 register 211 of FIG. 8 will function to energize AND gate 500 which is also under control of a clock pulse TCA from the line circuit logic block 222. The output of said AND gate 500 will set flip-flop 501 which will function to close AND gate 502 and open AND gate 503.

Closure of AND gate 502 will block the even clock pulses from passing through said AND gate 502 to the Z2 register 210 and advancing the information contained therein. The blockage of AND gate 502 continues for eight microseconds, thus effectively blocking the flow of information through the Z2 register for eight bit intervals and effectively delaying the information contained in the assembly store memory section to the buffer store memory section.

The eighth microsecond delay is effected by means of AND gate 503, through four-stage binary counter 504, and AND gate 505. When the flip-flop 501 became set and AND gate 503 became opened, the "1" to "0" transitions of the clock odd pulse supplied to input lead 512 of AND gate 503 caused counter 504 to step from a reset condition of zero progressively to the condition where the three stages thereof all contain a "1." At this point AND gate 505 became conductive and a mark appeared on its output lead 506. On the next 1 to 0 transition of the odd clock pulse, the counter 504 changed to a "0" or reset condition and the output of AND gate 505 changed from a mark to a space, the equivalent of a 1 to 0 transition. Such a 1 to 0 transition functioned to reset flip-flop 501, thus opening AND gate 502 and closing AND gate 503. Opening of AND gate 502 permits the even clock pulse to pass through AND gate 502 and to once again advance information to the Z2 register. The shifting of the word from the buffer storage to the assembly storage memory section is now completed.

It should be noted that closure of AND gate 503 functions to block the odd clock pulse from being supplied to counter 504, thereby completing the shifting operation.

An additional function of the 1 to 0 transition of the output of AND gate 505 is to place an activity bit in bit position 509 of the Z1 register through lead 506. Such activity bit is placed in the receive instruction store memory section. At the time the activity bit is placed in bit position 509, the data in the serial memory has advanced the equivalent of only seven bit positions so that when the activity bit is placed in bit position 509, the said bit position 509 actually represents the eighth bit position of the receive instruction store memory section.

Figure 8A:
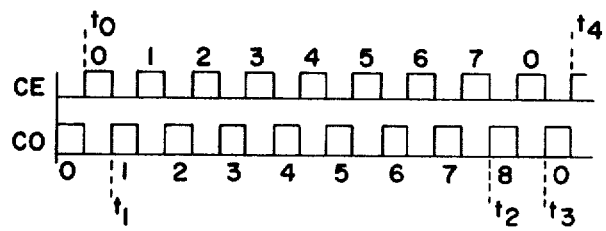

The foregoing description of the shifting of information from the assembly store to the buffer store memory section can perhaps be understood better with the aid of the timing chart in FIG. 8A, which shows an even clock pulse train and an odd clock pulse train. At time $t_0$ the sample count pulse occurs in the Z1 register and at the same time the TCA pulse occurs in FIG. 8, thereby opening the AND gate 503. One-half microsecond later at time $t_1$ the 1 to 0 transition of the odd clock pulse begins to pass through AND gate 503. At time $t_2$ eight of the 1 to 0 transitions of the odd clock pulse have passed through AND gate 503 into the counter 504 so that said counter 504 contains a binary count of 0001, which causes opening of AND gate 505. On the ninth 1 to 0 transition of the odd clock pulse at time $t_3$, the AND gate 505 passes a pulse to reset flip-flop 501, thereby completing the cycle. It will be noted from the waveform of FIG. 8A that between times $t_1$ and $t_3$, eight 1 to 0 transitions of the even clock pulses have been blocked from the Z2 register, thus effectively delaying eight bits of the circulating information by eight microseconds.

(VIII) LOGIC FOR INITIATING COUNT AND TIMING KEEPING COUNTERS AND FOR INCREMENTING STORED COUNT BY "1" EACH CYCLE OF OPERATION

There are three distinct operations to be performed on each of the two timekeeping counting circuits, i.e., the receive sample count memory sections and the transmit distribution count memory sections. These three operations are as follows:

(1) Initiating the count in the circuit
(2) Incrementing the count in the counting section
(3) Terminating the count in the counting section.

Figure 12:
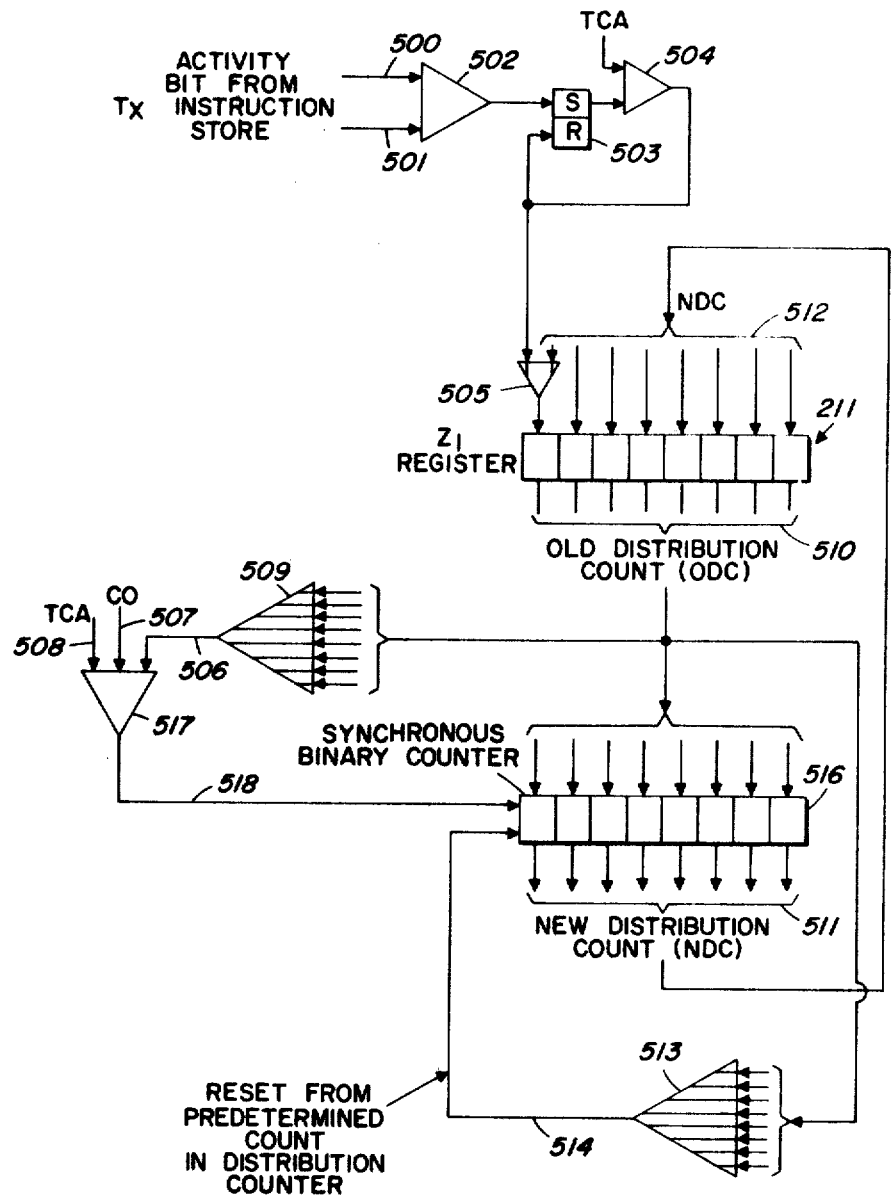
FIG. 12 shows the logic employed to increment the count of the timekeeping counting sections of the circulating memories once a count has been initiated therein.

The logic for performing all three of these operations is shown in FIG. 12 and will be discussed in the order given.

In FIG. 12 the Z1 register 211 is shown as having eight output leads 510, one from each stage thereof, and eight input leads 512, one for each stage thereof. The eight output leads 510 go to eight input leads of an external synchronous binary counter circuit 516. Said synchronous binary counter 516 has eight output leads 511 which are connected to corresponding leads of the eight input leads 512 of the Z1 register.

Generally speaking, the operation of the overall circuit is as follows. A count is initiated in the count memory section contained in the Z1 register 211 and each revolution of the serial memory said count is transferred to the synchronous binary counter 511 where it is incremented by "1" and then transferred back into the Z1 register 211. The entire operation of transfer and incrementing occurs within a one microsecond interval.

For discussion purposes, the distribution count memory section has been shown in FIG. 12. It is to be understood that the receive sample count memory section logic is quite similar with a few exceptions which will be noted later.

(A) The Distribution Count Memory Section

To initiate the count in the Z1 register, there must be present an activity bit in the transmit instruction store memory section as shown in FIG. 9. Such activity bit, as will be recalled, was placed in the transmit instruction store memory section upon the transfer of a word in the buffer store memory section to the distribution store memory section.

In FIG. 12, upon the occurrence of a TCB pulse, the AND gate 502 will become conductive to set flip-flop circuit 503, thus conditioning AND gate 504 to pass a pulse through OR gate 505 and into Z1 register 211 upon the occurrence of a TCA pulse. In this manner a count of one is initiated in a particular distribution count memory section 211 immediately after the transfer of the word from the transmit buffer storage memory section to the distribution store memory section.

The particular distribution count memory section will then circulate once in the serial memory and when it next appears in the Z1 register will perform several functions. One of these functions is to transfer the count of 1 immediately into the synchronous binary counter 516 by a parallel type transfer. The signals on the output leads 510 of the Z1 register are also supplied, through OR gate 509, to an input 506 of AND gate 517. Upon the coincidence of the TCA pulse and a 1 to 0 transition of an odd clock pulse supplied respectively to input leads 508 and 507 of AND gate 517, an output pulse will be supplied to the input of synchronous binary counter 516 via input lead 518, thereby incrementing the count contained in said synchronous binary counter 516 by one. It is to be noted that the incrementing occurs approximately one-half microsecond after the transfer of the count in the Z1 register to the synchronous binary counter 516.

Substantially simultaneously with the incrementing of the count in the synchronous binary counter 516, the new count contained therein is transferred back to the Z1 register via output leads 511 of binary counter 516 and input leads 512 of the Z1 register 211. Thereupon the count in the distribution count memory section will circulate through serial memory once again and the process will be repeated.

When the count in the distribution count memory section has reached a predetermined value, usually corresponding to the stop pulse of the Teletype word being processed, the AND gate 513 will respond to such predetermined count and will function to provide a reset pulse to the synchronous binary counter 516 through lead 514. Such reset pulse will override any count supplied from the Z1 register to the synchronous binary counter 516 so that the count transferred back to the Z1 register from the counter 516 will be zero.

(B) The Sample Count Memory Section

Figure 11:
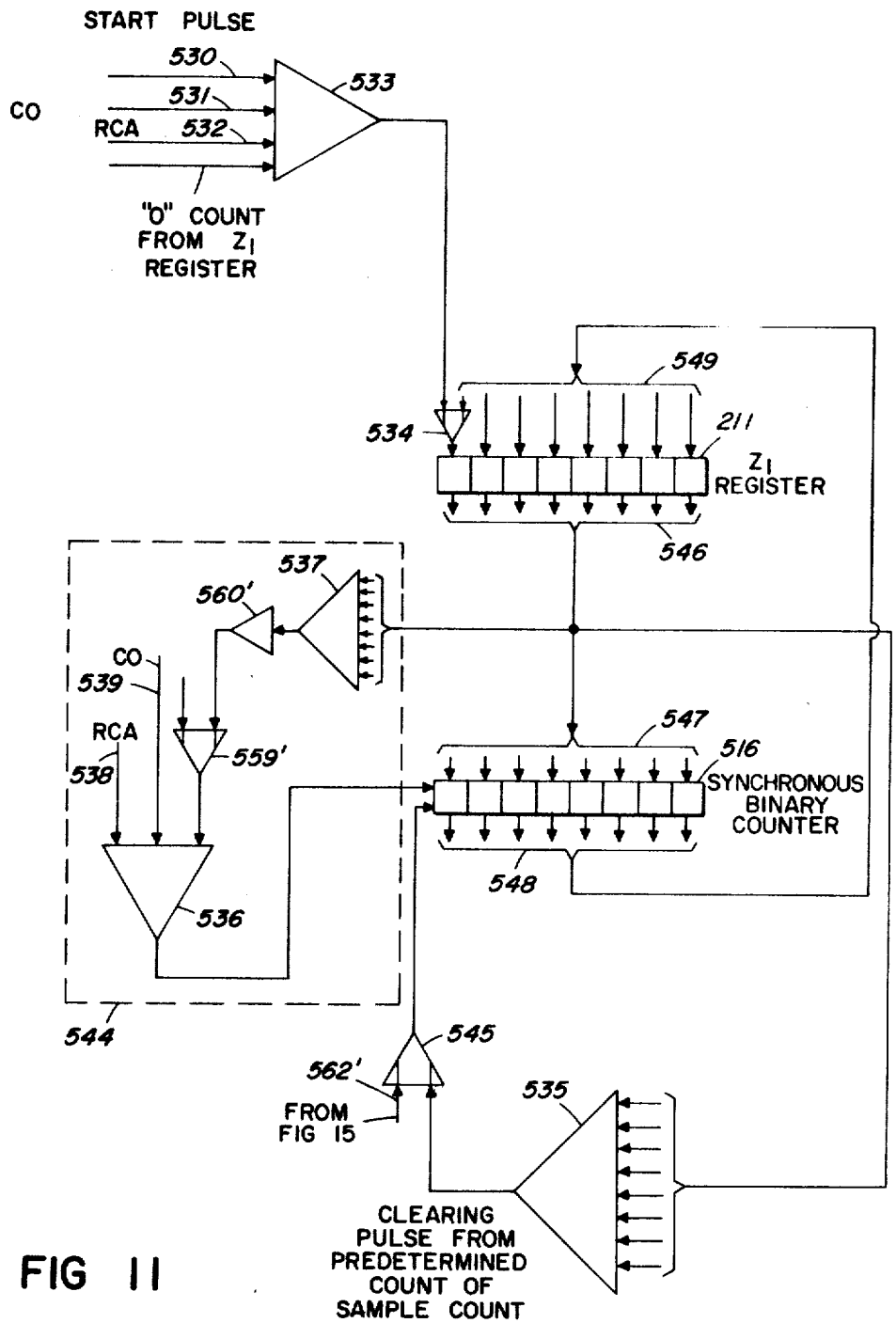
FIG. 11 shows the logic employed to initiate the count in the timekeeping circuit of the first circulating memories to control the assembly of a word from the Teletype machines and also to control the distribution of a word from the adapter to the Teletype machines.

The logic of FIG. 11 is quite similar to that of FIG. 12, with the basic difference that it applies to the sample count memory section rather than the distribution count memory section.

In FIG. 11 the count is initiated by the coincidence of pulses on input leads 530, 531, 532, and 529 to AND gate 533. The start pulse applied to input 530 is a pulse produced by a circuit means to be described later in section IX which detects the occurrence of a start pulse from the Teletype machine and applies a resultant signal to the input leads 530. The said resultant signal is also identified herein as a start pulse even though it is not the same start pulse received from the Teletype machine. The remaining three input terminals 531, 532, and 529 of AND gate 533 require coincidence respectively, of a 1 to 0 transition of a clock odd pulse, an RCA pulse, and a zero count from the Z2 register 211.

Energization of AND gate 533 places a count of 1 in the receive sample count memory section in Z1 register 211 at the proper time due to the RCA clock pulse applied to AND gate 533. Thus the count in the sample count memory section is initiated.

Incrementing of the count in the sample count memory section is identical to that described in connection with the distribution count memory section, except that an RCA pulse is applied to input lead 538 of AND gate 536 rather than the corresponding TCA pulse of FIG. 12.

Similarly, termination of the count in the sample count memory section is identical to that described with respect to the distribution count memory section of FIG. 12. The AND gate 535 responds to a predetermined count from the sample count memory section to reset the synchronous binary counter 516 to "0" so that the count transferred back from the binary counter 516 to the Z1 register is "0."

(IX) LOGIC FOR DETECTING THE START PULSE FROM A TTY

In order to verify the appearance of a start pulse from a Teletype machine, three successive samplings of the Teletype line must indicate the presence of a start pulse (a space). Each sampling is taken at time intervals of 1024 microseconds. As discussed in connection with FIG. 11, the first space sampling is entered directly into the sample count memory section of the Z1 register 211 of FIG. 11.

However, due to the presence of AND gate 560' and OR gate 559 of FIGS. 11 and 15, no incrementing of the synchronous binary counter 516 will occur during the same microsecond that the first count is entered into the Z1 register. A "1" must already be present either in the binary counter 516 in order for incrementing to occur. The sample count memory section then circulates once in the #1 serial memory and returns again to the Z1 register.

As mentioned above, in order to verify the existence of a start pulse in a Teletype machine, two additional spaces are required to be sampled from the output of the Teletype line. The verification of the reception of such two additional space samplings is accomplished with the logic of FIG. 15, which functions primarily to bypass the incrementing structure discussed in connection with FIG. 11.

In FIG. 15 the two AND gates 550 and 551 are designed to permit incrementing of the count contained in the Z1 register for two additional counts in the event no intervening mark samples are received from the Teletype line being sampled.

More specifically, AND gate 550 and AND gate 551 respond to counts of one and two, respectively, in the Z1 register to pass signals through OR gate 555, OR gate 559 and AND gate 536' to initiate the incrementing function of the binary counter 516 of FIG. 11. Such incrementing logic takes the place of the incrementing logic 544 of FIG. 11, for the first three counts of the sample count memory section.

During such first three counts the output of AND gate 537' is isolated from the input of AND gate 536' by means of AND gate 560 and flip-flop circuits 557 and 558. More specifically, during the first three counts the flip-flops 557 and 558 are both in a reset condition thus causing AND gate 556 to be in an open condition and the AND gate 560 to be in a closed condition.

Opening of AND gate 556 permits the output of AND gate 553, if such an output occurs during the one microsecond RCA clock pulse period, to override any incrementing function in the binary counter 516 of FIG. 11 and to clear said binary counter to zero. It will be noted that the input to AND gate 553 is a duplication of the inputs of each of the input AND gates 174 through 177 of FIG. 5. Thus the input signal to the input terminal 566 of AND gate 556 can be formed merely by ORing the outputs of the AND gates 174 through 177 of FIG. 5. As long as AND gate 556 is open the reception of a mark sampling from the particular Teletype line being sampled will result in a clearing of the synchronous binary counter 516 of FIG. 11. Thus during those two microsecond intervals when the synchronous binary counter 516 is incrementing from the count of 1 to a count of 2 and from a count of 2 to a count of 3, the occurrence of a signal on the output of AND gate 553 will function to completely clear the synchronous binary counter 516 in the Z1 register 211 (FIG. 11) so that the counting must be initiated again from the count of 1.

If, however, the counts of 2 and 3 can be accumulated in the sample count memory section of the Z1 register 211 so that AND gates 551 and 552, respectively, will become conductive on respective cycles of the serial memory, the output of AND gate 556 will be cut off, thus preventing a clearing of the synchronous binary counter 516 by the output of AND gate 553.

Cutting off AND gate 556 is accomplished when an output signal appears at the output of AND gate 552. Such output signal functions to set flip-flop 557, which in turn will set flip-flop 558, thus closing AND gate 556 and opening AND gate 560, respectively. Closure of AND gate 556, of course, blocks the output of AND gate 553 from the binary counter 516 of FIG. 11. Opening of AND gate 560 permits the passage of the output signal from OR gate 537' to the input of AND gate 536 and ultimately to the synchronous binary counter 516 so that the incrementing function can be performed.

The count is now established in the sample memory section of the Z1 register and will continue until the stop pulse from the associated Teletype machine occurs. Such stop pulse corresponds to some predetermined count of the sample counter memory section. At such predetermined count a signal is flagged to the input lead 567 which is connected to the reset sides of flip-flops 557 and 558 and functions to reset said flip-flops. Resetting of said flip-flops opens AND gate 556 and closes AND gate 560 in preparation for the reception of the next start pulse which will occur at some time in the future.

(X) LOGIC FOR ADAPTATION OF INVENTION FOR USE WITH MODEMS (A) General description In the discussion of the adaptation of the invention for use with modems, logic as detailed as that provided in the discussion of the adaptation of the invention for TTY use will not be set forth. In the modem adaptation, logic means similar to those used or employed in the TTY adaptation can be readily adapted to perform the shifting functions, the transfers of information between the adapter, the modems, and the input/output register, and the clocking pulses required to perform such functions and transfers.

Modem adapters perform bit to byte conversion, provide data buffering, and provide block transfer of data to and from the input channel. Generally speaking, the modem adapter of the present invention can service modems having any of the following characteristics:

(a) Synchronous or asynchronous data
(b) Bit-serial start-stop code format up to 8 bits per character
(c) Bit-parallel, character serial data up to 8 bits per character
(d) Serial data blocks of up to 4096 bits with a block (framing) pattern of up to 32 bits.

FIG. 17 is a block diagram of the modem adapter. The subunits within the adapter include line termination circuit 600, modem data gate 601, decode and logic circuitry 602, serial memories 603, 604, and 605, the input/output data gate 606, and the input/output control 607.

The line termination circuit 600 includes modem control and data interface circuits, signal level conversion circuits, and bit to byte conversion circuits. The immediately aforementioned circuits can be installed in the adapter as needed, thus allowing a system to be implemented and expanded on a per modem basis. The serial memories 603, 604, and 605 provide buffer storage for several bytes of data for each modem serviced by the adapter. The modem data gate 601 and associated logic circuits 602 control the transfer of data between the serial memories 603–605 and the line termination circuits 600. Data transfer between the serial memories 603 and 604, and the input/output control unit 607 is under control of input/output data gates 606.

The decode and logic unit 602 performs the necessary logic operation for controlling the timing of input and output data bit between the adapter and the modem, under the control of an external synchronous data modem, and also establishes requests for input/output data block transfers.

The modem adapter of FIG. 17 can be employed with either high-speed or low-speed modems. More specifically, the adapter is able to service modems which operate at data rates as low as 4500 bits per second. On the other hand, the adapter can be constructed to service high-speed modems which operate up to 360,000 bits per second. The operation of each type of modem adapter is similar except for assignment of the serial memory storage capability. In the following paragraph the description will be limited to the general organization of a modem adapter for servicing the lower speed modems. The description, however, is applicable to higher speed modems with, of course, appropriate changes in timing which will be readily apparent to one skilled in the art.

Each type modem, or adapter, can be constructed to service a plurality of modems as, for example, two to eight modems, depending upon the speed of the modem. The particular adapter to be described and which is shown in FIG. 17, has a given capacity of serial memory storage. A group of typical data modems which can be handled thereby are shown in the following table:

TABLE 1

| Max. data rate-bits/sec. | Modems per adapter | Bytes stored per modem |
|---|---|---|
| 600 | 16 | 8 |
| 1,200 | 8 | 16 |
| 2,000 | 4 | 32 |
| 2,400 | 4 | 32 |
| 2,400 | 4 | 32 |
| 2,400 | 4 | 32 |
| 2,400 | 4 | 32 |
| 2,400 | 4 | 32 |
| 4,500 | 2 | 64 |

The maximum data rate, the number of modems which may be connected to the adapter, and the bytes of storage per modem are tabulated in the above table. A combination of the modems listed in the above table can be serviced by each adapter. However, each additional type modem serviced requires strapping and hardware options to accommodate the control and the timing involved.

The line termination circuits 600 of FIG. 17 which provide storage and signal level conversion between the data modems 610 and the adapter are available in two basic forms; one form for interfacing with a bit serial data modem and another form for interfacing with a bit parallel, character-serial data modem.

The bit serial data modem receive circuits provide for serial parallel conversion of incoming data for input to the serial memory 604. Two 8-bit shift registers (not shown) are employed to accomplish this conversion. One of the 8-bit shift memories acts as an assembly register for incoming serial data and the outer acts as a buffer store so that the timing between the data modem and the serial memory may be independent. When a complete 8-bit byte has been assembled in the first 8-bit shift register, it is gated in parallel form to the second shift register where it waits until the appropriate serial memory storage area is accessible.

The bit parallel line termination circuits 600 provide two serial bits of storage for each of the parallel data bits, thus allowing the modem timing to be isolated from the serial memory timing period. Data is accepted from the modem into the first bit storage location of the line termination circuits in bit parallel form, shifted to the second buffer for transfer to the serial member 604, then stored in said serial memory 604 when the appropriate storage area becomes available.

The modem data gate 601 controls the transfer of data between the modems and the serial memories 603 and 604. Such data transfers are made to and from the correct modem lines, when the appropriate memory location becomes available in the memory register 612 or 613. Timing for the data gates is provided by decoding the timing and control information from the common equipment 607, which contains the basic timing for the system.

From the modem data gate the data is gated into the serial memory 604 until several bytes have been accumulated from each modem; the number of bytes being determined by the capacity of the serial memory. Such data is then transferred in blocks through the input/output data gate 606 to the input/output control unit 607 and then through the input/output channel of 611 into the data processor.

Outgoing data blocks are transferred periodically from the input/output channel 611 to the modem adapter. Each data block contains several data bytes for each modem serviced by the adapter. Such bytes are stored in the serial memory 603 and subsequently distributed sequentially to the line termination circuit 600 to the modem data gate 601.

The line termination circuit 600 for bit serial data modems provide for parallel-to-serial data conversion for transmitting data to the modem. Such line termination circuits inclue two 8-bit shift registers; one shift register serving as a buffer store means and the other serving as a distribution register for outgoing data bit. The data is received from the serial memory 603 in 8-bit parallel bytes and stored in the buffer register of the line termination circuit 600. When the distribution register is cleared of the previous data, the contents of the buffer register are gated to the distribution register and the data is then shifted out to the modem at the correct time as determined by the common equipment timing circuit 607.

Said line termination circuits which serve bit-parallel data modems provide two serial bits of storage for each of the parallel data bit, thus allowing the modem timing to be isolated from the serial memory timing.

In servicing synchronous data modems, the timing of the incoming and outgoing data transfers is under the control of the data modems synchronizing signal.

(B) Detailed Description of Function of Serial Memories in Modem Adapter

Serial memories 603, 604, and 605 each consist of a delay line memory and an associated Z register similar to the serial memories discussed in conneceion with the TTY adapter. The Z1 register 613 and associated delay line 604 are used for storing incoming data. The Z2 register 612 and the associated delay line 603 are used for transmitting data, and the Z3 register 614 and its associated delay line 605 function to store instruction and control information employng the same format as discussed in connection with the TTY adapter.

Each serial memory has storage capacity of 1024 bits, of which 1016 bits are in the delay line and eight bits in the shift register. Each delay line and its Z register is divided into 128 8-bit bytes with each byte on both the transmit and the received delay line storing one data character. The bytes on the instruction store delay line contain control bits for the corresponding byte of the other two delay lines, 603 and 604.

Memory location assignments are determined by the types of modems being serviced and is shown in FIG. 18 and Table 1 set forth hereinabove. As an example, if all modems had a maximum bit rate of 1200 bits per second, eight modems could be serviced by assigning 16 byte storage slots to each modem. More specifically, eight modem times eight bits times 16 bytes equal 1024 bit positions.

Continuing with other examples taken from the above Table 1, by storing 8 bytes from each 600 bit-per-second modem, 16 bytes for each 1200 bit-per-second modem, 32 bytes for each 2400 bit-per-second modem, and 64 bits per each 4500 bit-per-second modem, data can be transferred in blocks to and from the computer at the same rate as the Teletype line adapter (once every 98.304 milliseconds, or every 96 delay line access time). Memory assignments are sequential, i.e., bytes 1 through 16 for modem 1; 17 through 32 for modem 2, etc., in the case where 1200 bits per second modems are serviced.

The input/output data gates 606 transfer data between the serial memories 603 and 604 of the adapter and the input/output control unit 607. The data bytes being transmitted to the input/output channel 611 are transferred to the input/output data gates 606 when said bytes appear in the Z1 register 613. In coming data bytes from the input/output channel 611 are gated through input-output data gates 606 to the Z2 register 612 at the appropriate time for storage on the delay line 603.

A data block transfer for a single adapter takes 1.024 milliseconds. Separate 1.024 millisecond periods are used to transmit and receive. When more than one adapter is employed, data bytes are interleaved as shown in FIG. 19, to allow a byte transfer rate of one byte every four microseconds. Such interleaving also permits a data block to be transferred to or from two adapters in the same 1.024 millisecond time period (one path at the delay line). If there are four adapters, additional 1.024 millisecond periods are needed for each additional adapter or pair of adapters.

(C) Operation of Modem Adapter

In the particular form of the invention being described, there are, for the receive function, 16 memory bytes assigned to each modem of modems 610 in FIG. 17. Assuming that each modem has been operating for a period of time there will be data bytes stored in the first several memory locations for all modems being serviced. At the time when the first empty memory location for a particular modem appears in the Z1 register 613, that modem's line termination circuits in the block 600 will be interrogated to determine if there is a new character in the buffer store. If so, the character is gated into the Z1 register 613 and stored on the delay line 604. If not, no transfer is made from the modem to the adapter. The same process is repeated for each modem in turn, as its serial memory storage area becomes accessible. Each time a character is stored, a bit is set in the associated instruction byte.

Every 96 turns (98.304 milliseconds) of the serial memory 604 a block of data composed of the contents of every memory location in the serial memory is transmitted to the input/output channel 611. Bytes are read out of the Z1 register 613 every eight microseconds. At this time, all the "characters stored" bits are cleared in the instruction byte. Because the data transmission rate to the input channel is slightly faster than the rate that data words are received, it is necessary that dummy characters be transmitted occasionally with the data bytes. when there is no data being received from a modem all characters transmitted will be dummy characters.

During the aforementioned block transfer of data, a request for data on the next transfer from the input/output register 611 to the adapter is transmitted. Such request is in the form of one "data request word" for each modem, which "data request word" was previously compiled in the instruction store memory from information in the transmit memory.

A "data request word" contains the address of the last available byte storage area in the circulating memory. The data processor (not shown) can then determine which memory locations must be loaded by comparing this address with the address which is provided on the preceding transfer from the input/output register 611 to the adapter of FIG. 17.

As discussed above, data is transmitted from the input/ output channel 611 to the adapter in blocks. The block transfer occurs in response to the data request which takes place, as discussed above, every 98.304 milliseconds during the receive cycle of operation. A data block, such as data block 650 of FIG. 19, contains a number of data bytes requested for each modem plus the necessary fill characters or dummy characters. This block of data, less the dummy characters, is stored on the delay line (one byte every microsecond) in the correct memory location starting with memory location one. The foregoing is accomplished in one complete access period of the delay line which covers an interval of 1.024 milliseconds, as shown in FIG. 19. Each time a byte is stored, a "byte stored" bit is set in the appropriate instruction store memory section of the serial memory 605 of FIG. 17.

Not all the data bytes that were received from the previous data block transfer will have been transmitted to the modems at the same time as the block transfer to any other modem is completed. Therefore, not all storage locations will be clear and ready to accept new data during the transmit time $T_X$ shown as time interval 650 in FIG. 19.

The data byte that has not yet been transmitted may be in any location of a memory area assigned to each modem, but they will be sequential. The address of the last transmit memory location which has been cleared is stored in the data request word.

The fact that not all serial memory locations are clear requires the computer to insert dummy characters in the output data block for those bytes that would normally be stored in those locations. Such dummy bytes are not loaded into the serial memory by the modem adapter, but instead are employed to maintain the output data byte count for loading the serial memory. In a typical example of the foregoing, refer to FIG. 20A and assume that memory locations 14, 15, 16, and 1 through 10, have been cleared since the last data block transfer. Therefore, the number "10" is stored in the data request word to indicate to the processor the last clear data area, which is of course the bit position of the area following 10, i.e., area 11. In the next data block transfer, the processor must provide data bits for serial memory locations 14, 15, 16, and 1 through 10. It stands that data processor, consequently, sends dummy characters for locations 11, 12, and 13. However, the actual data block transmission sequence must be for the serial memory locations 1 through 16 in that order. Such order is shown in FIG. 20.

At a certain time, determined by the modem speed, a byte is gated from the line termination of buffer storage register through the output register, and from there to the modem 610 in FIG. 17. The buffer store register is now ready to accept another byte from the delay line. Such data byte will be gated to the buffer as soon as it appears in the Z2 register 612 of FIG. 17. At the same time, the "byte stored" bit is cleared from the instruction area of serial memory 605. The foregoing procedure is repeated with data bytes being read from sequential memory locations 1 through 16. As such a sequence progresses, data request words are compiled from the instruction store memory.

Returning again to FIG. 19, the timing charts D and C illustrate that a plurality of adapters can be employed with each data processor. More specifically, six adapters can easily be employed with one data processor by interleaving as shown in FIGS. 19A, 19B, and 19C.

The planning charts of FIGS. 19D and 19E illustrate how two adapters can be serviced by the same input/output channel during the same 1.024 milliseconds, such as time interval 651 of FIG. 19C.

It is to be understood that the forms of the invention described herein are but preferred embodiments thereof and that various other applications of the invention are possible and further that other detailed logic schemes will be apparent to those skilled in the art to perform the various functions without departing from the spirit or scope of the invention.

We claim:

1. An adapter system for transferring data, comprised of data words, bidirectionally between data processor means and a plurality of peripheral devices and constructed to receive, assemble, store, and distribute such data, and comprising:

first circulating memory means constructed to circulate data therein and comprising first delay line means and first shift register means connected in series therewith;

second circulating memory means constructed to circulate data therein and comprising second delay means and second shift register means connected in series therewith;

clock pulse source means;

polling means comprising first counting means responsive to said clock pulse means to periodically poll each of said peripheral devices at predetermined, regular time intervals;

said first and second circulating data memory means each having a predetermined number of circulating bit positions therein allocated to the function of transferring data from said peripheral devices to said data processor means, and a second group of circulating bit positions therein allocated to the function of transferring data from said data processor means to said peripheral devices;

each of said groups of circulating bit positions comprising a plurality of segments of consecutive circulating bit positions with each segment being identified with a given corresponding peripheral device and with each segment being comprised of first and second memory sections of contiguous circulating bit positions;

said first and second circulating memories each further constructed to have a first section of a predetermined segment of circulating bit positions occur in said first and second shift register means, respectively, when a given peripheral device is polled, thus providing a means for separately processing each of the first sections of circulating bit positions in said first and second circulating memory means;

first timekeeping means constructed to respond to the initiation of reception of data from one said peripheral devices to initiate first timekeeping counts in the corresponding segments of circulating bit positions;

said first timekeeping means further constructed to increment said timekeeping counts, once initiated, in response to each complete circulation time of said first circulating memory;

first gating means for transferring data from said peripheral devices to said segments of said first group of circulating bit positions in response to predetermined counts of said first timekeeping count;

second gating means responsive to predetermined counts of said first counting means to transfer data bidirectionally between said second circulating memory means and said data processor means;

and distributing means responsive to said first counting means to distribute data from said second circulating memory means to said peripheral devices.

2. An adapter system in accordance with claim 1 in which:

said first counter means is constructed to condition said first gating means for energization which a first memory section of said first group of circulating bit positions is occupying said second shift register to complete the electrical path for transfer of data from the addressed peripheral device to said first memory section; and in which said first gating means is further responsive to predetermined counts of said timekeeping count to transfer data from said peripheral devices to predetermined bit positions of said first memory sections of said first group of circulating bit positions of said second circular memory means at each of said predetermined timekeeping counts.

3. An adapter system in accordance with claim 2 in which said distributing means comprises;

second timekeeping means constructed to respond to the reception of data from said data processor means for distribution to a given peripheral device to initiate a second timekeeping count in the corresponding segment of said second group of circulating data bit positions;

said second timekeeping means further constructed to increment said second timekeeping counts in response to each complete circulation time of said first circulating memory;

and third gating means responsive to predetermined counts of said first counting means and to predetermined counts of said second timekeeping count to transfer data words, in a predetermined order, from the first memory sections of said second group of bit positions of said second circulating memory means to selected ones of said peripheral devices.

4. An adapter system in accordance with claim 3 comprising:

storage means having a plurality of bit storage positions;

fourth gating means responsive to the transfer of words from said second memory sections to said first memory sections of the second group of circulating bit positions of said second circulating memory means to form in said storage means a character request word which indicates those second memory sections which are clear and ready to accept another word from said data processor;

and control means responsive to said first counting means for transferring said character request word to said data processor at periodic intervals to inform said data processor of those second memory sections which are ready to accept another word from said data processor.

5. An adapter system in accordance with claim 2 comprising:

means responsive to the completion of the transfer of a word from a given peripheral device to a first memory section of a segment of said first group of circulating bit positions of said second circular memory means to transfer said word to the second memory section of said segment of said first group of circulating bit positions of said second circulating memory means.

6. An adapter system in accordance with claim 5 in which said distributing means comprises:

second timekeeping means constructed to respond to the reception of data from said data processor means for distribution to a given peripheral device to initiate a second timekeeping count in the corresponding segment of said second group of circulating data bit positions;

said second timekeeping means further constructed to increment said second timekeeping counts in response to each complete circulation time of said first circulating memory;

and in which said second gating means is responsive to predetermined counts of said first counting means to become opened to transfer data from said data processor to said second memory sections of said second group of bit positions of said second circular memory;

and comprising third gating means responsive to a predetermined count of said second timekeeping counts for transferring said data from second memory sections of segments of said second group of bit positions of said second circulating memory means to the first memory sections of said segments.

7. An adapter system in accordance with claim 6 in which said distributing means comprises:

fourth gating means responsive to predetermined counts of said first counting means and to predetermined counts of said second timekeeping counts to transfer data in a predetermined order from said first memory sections of said second group of bit positions of said second circulating memory means to selected ones of said peripheral devices.

8. An adapter system in accordance with claim 7 comprising:

storage means having a plurality of bit storage positions;

fifth gating means responsive to the transfer of words from said second memory sections to said first memory sections of the second group of circulating bit positions of said second circulating memory means to form in said storage means a character request word which indicates those second memory sections which are clear and ready to accept another word from said data processor;

and control means responsive to said first counting means for transferring said character request word to said data processor at periodic intervals to inform said data processor of those second memory sections which are ready to accept another word from said data processor.

9. An adapter system for transferring data, comprised of data words, bidirectionally between data processor means and a plurality of peripheral devices and constructed to receive, assemble, store, and distribute such data, and comprising:

first circulating memory means constructed to circulate data therein and comprising first delay line means and first shift register means connected in series therewith;

second circulating memory means constructed to circulate data therein and comprising second delay line means and second shift register means connected in series therewith;

clock pulse source means;

polling means comprising first counting means responsive to said clock pulse means to periodically poll each of said peripheral devices at predetermined, regular time intervals;

said first and second circulating data memory means each having a predetermined number of bit positions therein with a first group of circulating bit positions therein allocated to the function of transferring data from said peripheral devices to said data processor means, and a second group of circulating bit positions therein allocated to the function of transferring data from said data processor means to said peripheral devices;

each of said groups of circulating bit positions comprising a plurality of segments of consecutive circulating bit positions with each segment being identified with a given corresponding peripheral device and with each segment being comprised of first and second memory sections of contiguous bit positions;

said first and second circulating memories each further constructed to have a first section of a predetermined segment of consecutive bit positions occur in said first and second shift register means, respectively, when a given peripheral device is polled, thus providing a unique and exclusive section of bit positions in said first and second circulating memory for each of said peripheral devices;

said first circulating memory means constructed to store first and second timekeeping counts in each segment of said first and second groups of circulating bit positions;

first timekeeping means constructed to respond to the initiation of reception of data from one said peripheral devices to initiate first timekeeping counts in the corresponding segments of circulating bit positions of said first group of circulating bit positions;

said first timekeeping means further constructed to increment said timekeeping counts in response to each complete circulation time of said first circulating memory;

first gating means for transferring data from said peripheral devices to said segments of said first group of circulating bit positions in response to predetermined counts of said first counting means and said first timekeeping counts;

second timekeeping means constructed to respond to the reception of data from said data processor means for distribution to a given peripheral device to initiate a second timekeeping count in the corresponding segment of said second group of circulating data bit positions;

said second timekeeping means further constructed to increment said second timekeeping counts in response to each complete circulation time of said first circulating memory means;

second gating means responsive to predetermined counts of said first counting means to open said second gating means to transfer data bidirectionally between second circulating memory means and said data processor;

and distributing means responsive to predetermined counts of said first counting means and said second timekeeping count to distribute data from said second circulating memory means to said peripheral devices.

10. An adapter system in accordance with claim 9 in which:

said first counter means is constructed to condition said first gating means for energization when a first memory section of said first group of circulating bit positions is occupying said second shift register to complete the electrical path for transfer of data from the addressed peripheral device to said first memory section; and, in which said first gating means is further responsive to predetermined counts of said first timekeeping counts to transfer data from said peripheral devices to predetermined bit positions of said first memory sections of said first group of circulating bit positions of said second circular memory means at each of said predetermined timekeeping counts.

11. An adapter system in accordance with claim 10 comprising:

means responsive to the completion of the transfer of a word from a given peripheral device to a first memory section of a segment of said first group of circulating bit positions of said second circular memory means to transfer said word to the second memory section of said segment of said first group of circulating bit positions of said second circulating memory means.

12. An adapter system in accordance with claim 11 in which:

said second gating means is responsive to predetermined counts of said first counting means to become opened to transfer data from said data processor to said second memory sections of said second group of bit positions of said second circular memory;

and comprising third gating means responsive to a predetermined count of said second timekeeping means for transferring said data from second memory sections of sections of said second group of bit positions of said second circulating memory means to the first memory sections of said segments.

13. An adapter system in accordance with claim 12 in which distributing means comprising:

fourth gating means responsive to predetermined counts of said first counting means and to predetermined counts of said second timekeeping counts to transfer data in a predetermined order from said first memory sections of said second group of bit positions of said second circulating memory to selected ones of said peripheral devices.

14. An adapter system in accordance with claim 13 comprising:

storage means having a plurality of bit storage positions;

fifth gating means responsive to the transfer of words from said second memory sections to said first memory sections of the second group of circulating bit positions of said second circulating memory means to form in said storage means a character request word which indicates those second memory sections which are clear and ready to accept another word from said data processor;

and control means responsive to said first counting means and to a predetermined count of said second counting means for transferring said character request word to said data processor at periodic intervals to inform said data processor of those second memory sections which are ready to accept another word from said data processor.

15. An adapter system for transferring data bidirectionally between data processor means and a plurality of peripheral devices and constructed to receive, assemble, store, and distribute such data and comprising:

first and second circulating memory means comprising, respectively, first and second delay line means each having a plurality of circulating data bit positions, and first and second access means for writing data into or reading data from, said first and second circulating memory means, respectively;

addressing means for identifying each data bit positions as it passes through said access means;

timekeeping means responsive to the reception of data from said data processor means or from said peripheral devices for initiating timekeeping counts in said circulating memory means and for keeping track of the number of cycles of circulation of each bit position in said circulating memory;

means for polling each of said peripheral devices at predetermined time intervals;

first data transferring means comprising first gating means responsive to said addressing means and said timekeeping counts for transferring data from said polled peripheral devices into said first access means at predetermined times in the circulation cycle of said first circulating memory means at the data output rate of said peripheral devices;

second data transferring means comprising second gating means responsive to said addressing means and said timekeeping counts for transferring data from said first access means to said data processing means in a form compatible with said data processing means;

third data transferring means comprising third gating means responsive to said addressing means and said timekeeping counts for transferring data from said data processing means to said second access means at predetermined time intervals at the data output rate of said data processing means;

and fourth data transferring means comprising fourth gating means responsive to said addressing means and said timekeeping counts for transferring data from said second access means to said peripheral devices in a form compatible with said peripheral devices.

16. An adapter system in accordance with claim 15 in which said first and second access means comprise first and second shift register means, respectively.

17. An adapter system for transferring data bidirectionally between data processor means and a plurality of peripheral devices and constructed to receive, assemble, store, and distribute such data and comprising:

first and second circulating memory means comprising first and second delay line means, respectively, each having N circulating data bit positions and a delay time T, and first and second storage means, respectively, connected in series therewith, with each storage means having the capacity to store M data bits, each for a time interval $MT/N$;

addressing means for identifying each data bit position as it passes through said storage means;

timekeeping means for keeping track of the number of cycles of circulation of each bit position in said circulating memory;

means for polling each of said peripheral devices at predetermined time intervals;

first data transferring means comprising first gating means responsive to said addressing means and said timekeeping means for transferring data from said polled peripheral devices into said first storage means at predetermined times in the circulation cycle of said first circulating memory means at the data output rate of said peripheral devices;

second data transferring means comprising second gating means responsive to said addressing means and said timekeeping means for transferring data from said first storage means to said data processing means in a form compatible with said data processing means;

third data transferring means comprising third gating means responsive to said addressing means and said timekeeping means for transferring data from said data processing means to said second storage means at predetermined time intervals at the data rate of said data processing means;

and fourth data transferring means comprising fourth gating means responsive to said addressing means and said timekeeping means for transferring data stored from said second storage means to said peripheral devices in a form compatible with said peripheral devices.

18. An adapter system in accordance with claim 17 in which said first and second storage means comprise first and second shift register means, respectively.

References Cited
UNITED STATES PATENTS

| | | | |
|---|---|---|---|
| 3,045,217 | 7/1962 | Housman et al. | 340—172.5 XR |
| 3,139,521 | 6/1964 | Johnson | 340—172.5 XR |
| 3,290,648 | 12/1966 | Smeltzer | 340—172.5 XR |
| 3,331,060 | 7/1967 | Willis | 340—172.5 |
| 3,362,015 | 1/1968 | Mackie et al. | 340—172.5 |
| 3,417,377 | 12/1968 | Vietor et al. | 340—172.5 |

PAUL J. HENON, Primary Examiner

H. E. SPRINGBORN, Assistant Examiner